US011532817B2

(12) United States Patent
Yamamoto et al.

(10) Patent No.: US 11,532,817 B2
(45) Date of Patent: Dec. 20, 2022

(54) BINDER COMPOSITION FOR NONAQUEOUS SECONDARY BATTERIES AND SLURRY COMPOSITION FOR NONAQUEOUS SECONDARY BATTERIES

(71) Applicant: ZEON CORPORATION, Tokyo (JP)

(72) Inventors: Norikazu Yamamoto, Tokyo (JP); Hidetake Ishii, Tokyo (JP); Yusaku Matsuo, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 25 days.

(21) Appl. No.: 16/492,830

(22) PCT Filed: Mar. 5, 2018

(86) PCT No.: PCT/JP2018/008285
§ 371 (c)(1),
(2) Date: Sep. 10, 2019

(87) PCT Pub. No.: WO2018/173717
PCT Pub. Date: Sep. 27, 2018

(65) Prior Publication Data
US 2020/0152985 A1 May 14, 2020

(30) Foreign Application Priority Data
Mar. 24, 2017 (JP) .............................. JP2017-058418

(51) Int. Cl.
H01M 4/00 (2006.01)
H01M 4/62 (2006.01)
H01M 4/36 (2006.01)
H01M 4/13 (2010.01)
C08L 47/00 (2006.01)
H01M 4/04 (2006.01)
H01M 50/403 (2021.01)
H01M 50/449 (2021.01)

(52) U.S. Cl.
CPC ............. H01M 4/622 (2013.01); C08L 47/00 (2013.01); H01M 4/0404 (2013.01); H01M 4/13 (2013.01); H01M 4/362 (2013.01); H01M 50/403 (2021.01); H01M 50/449 (2021.01)

(58) Field of Classification Search
CPC .. H01M 4/622; H01M 50/403; H01M 50/449; H01M 4/362; H01M 4/13; H01M 4/0404; H01M 4/139; H01M 10/052; H01M 50/446; H01M 50/411; H01M 2300/0025; C08L 47/00; Y02E 60/10
See application file for complete search history.

(56) References Cited

U.S. PATENT DOCUMENTS

| 2013/0316235 A1* | 11/2013 | Yasuda | H01M 4/04 429/211 |
| 2013/0330622 A1* | 12/2013 | Sasaki | H01M 4/1395 252/182.1 |
| 2014/0239239 A1* | 8/2014 | Cha | H01M 4/134 525/218 |
| 2015/0203722 A1* | 7/2015 | Yoshida | C09J 9/02 252/511 |
| 2015/0353780 A1* | 12/2015 | Yoshida | H01M 4/667 252/511 |
| 2016/0118664 A1* | 4/2016 | Sonobe | H01M 4/62 252/182.1 |
| 2016/0204439 A1* | 7/2016 | Sonobe | H01M 4/583 524/45 |
| 2016/0260973 A1 | 9/2016 | Sonobe et al. | |
| 2017/0062828 A1 | 3/2017 | Sonobe et al. | |
| 2017/0250389 A1* | 8/2017 | Toyoda | H01M 50/46 |

FOREIGN PATENT DOCUMENTS

| CN | 104396059 A | 3/2015 |
| EP | 3154113 A1 | 4/2017 |
| JP | H08250123 A | 9/1996 |
| JP | 2001015116 A | 1/2001 |
| JP | 2011165430 A | 8/2011 |
| JP | 2014011019 A * | 1/2014 |
| JP | 2014056813 A | 3/2014 |
| KR | 1020140124322 A | 10/2014 |
| KR | 1020160077057 A | 7/2016 |
| WO | 2014014006 A1 | 1/2014 |
| WO | 2014021401 A1 | 2/2014 |
| WO | 2015186363 A1 | 12/2015 |
| WO | 2016013223 A1 | 1/2016 |

OTHER PUBLICATIONS

Machine translation of JP-2014011019-A, obtained Sep. 2021 (Year: 2014).*
Jul. 16, 2020, Communication pursuant to Rule 114(2) EPC issued by the European Patent Office in the corresponding European Patent Application No. 18771653.5.
Nov. 27, 2020, the Extended European Search Report issued by the European Patent Office in the corresponding European Patent Application No. 18771653.5.
Sep. 24, 2019, International Preliminary Report on Patentability issued in the International Patent Application No. PCT/JP2018/008285.

(Continued)

Primary Examiner — Nicholas P D'Aniello
(74) Attorney, Agent, or Firm — Kenja IP Law PC

(57) ABSTRACT

A binder composition for a non-aqueous secondary battery including: a water-insoluble polymer and a water-soluble polymer, wherein the water-insoluble polymer contains 70% by weight or more and 100% by weight or less of an aliphatic conjugated diene monomer unit, and the water-soluble polymer has a carboxy group and a hydroxy group. The water-soluble polymer preferably contains a carboxy group-containing monomer unit and a hydroxy group-containing monomer unit. Also provided are a slurry composition for a non-aqueous secondary battery, including the binder composition, an electrode, a separator, a secondary battery and methods for producing the same.

12 Claims, No Drawings

(56) References Cited

OTHER PUBLICATIONS

Apr. 24, 2018, International Search Report issued in the International Patent Application No. PCT/JP2018/008285.

* cited by examiner

BINDER COMPOSITION FOR NONAQUEOUS SECONDARY BATTERIES AND SLURRY COMPOSITION FOR NONAQUEOUS SECONDARY BATTERIES

FIELD

The present invention relates to a binder composition for a non-aqueous secondary battery and a slurry composition for a non-aqueous secondary battery.

BACKGROUND

Non-aqueous secondary batteries such as lithium ion secondary batteries are widely used as a power source for mobile terminals. In order to enhance the performance of secondary batteries, improvement of battery members such as an electrode is under study. An electrode is usually produced by mixing an electrode active material and the like to a dispersion medium to obtain a slurry composition, applying this slurry composition onto a current collector, and drying the applied slurry composition. In consideration of the environment, use of water as the dispersion medium for preparing a slurry composition to produce an electrode is under study (Patent Literature 1 and Patent Literature 2).

CITATION LIST

Patent Literature

Patent Literature 1: International Publication No. 2014/021401
Patent Literature 2: International Publication No. 2014/014006

SUMMARY

Technical Problem

An electrode produced with a known slurry composition did not have sufficient adhesion ability with another battery member in some cases. In such a case, an adhesive layer needed to be further disposed to an electrode.

If an electrode produced by applying a slurry composition onto a current collector has sufficient adhesion ability with battery members such as a separator, the necessity of the provision of the additional adhesive layer on the electrode can be eliminated, and thereby the production process of secondary batteries can be simplified.

Further, if a functional layer such as a porous layer which can be included in a separator has sufficient adhesion ability with battery members such as an electrode, the necessity of the provision of the additional adhesive layer on the battery member can be eliminated, and thereby the production process of secondary batteries can be simplified.

Furthermore, as requirements for secondary batteries, decrease in discharging capacity caused by repetition of charging-discharging has to be suppressed, and swelling of the battery caused by repetition of charging-discharging also has to be suppressed.

An object of the present invention is to provide a binder composition for a non-aqueous secondary battery capable of forming a layer having excellent adhesion ability, a slurry composition for a non-aqueous secondary battery containing the binder composition and water, and a non-aqueous secondary battery in which decrease in discharging capacity and battery swelling caused by repetition of charging-discharging are suppressed.

Solution to Problem

The present inventors intensively conducted study in view of the aforementioned problem and, as a result, have found that the aforementioned problem can be resolved by a binder composition containing a combination of a water-insoluble polymer containing specific components at a specific ratio and a specific water-soluble polymer. Thus, the present invention has been accomplished. That is, the present invention is as follows.

<1> A binder composition for a non-aqueous secondary battery comprising: a water-insoluble polymer and a water-soluble polymer, wherein the water-insoluble polymer contains 70% by weight or more and 100% by weight or less of an aliphatic conjugated diene monomer unit, and the water-soluble polymer has a carboxy group and a hydroxy group.

<2> The binder composition for a non-aqueous secondary battery according to <1>, wherein the water-soluble polymer contains a carboxy group-containing monomer unit and a hydroxy group-containing monomer unit.

<3> The binder composition for a non-aqueous secondary battery according to <1> or <2>, wherein the water-insoluble polymer has a tetrahydrofuran insoluble content of 1% by weight or more and 60% by weight or less.

<4> The binder composition for a non-aqueous secondary battery according to any one of <1> to <3>, wherein a volume-average particle diameter of the water-insoluble polymer is 0.1 μm or more and 5 μm or less.

<5> The binder composition for a non-aqueous secondary battery according to any one of <1> to <4>, wherein a viscosity of a 1 wt % aqueous solution of the water-soluble polymer is 10 mPa·s or more and 10000 mPa·s or less.

<6> A slurry composition for a non-aqueous secondary battery comprising the binder composition for a non-aqueous secondary battery according to any one of <1> to <5>, and water.

<7> The slurry composition for a non-aqueous secondary battery according to <6>, further comprising an electrode active material.

<8> The slurry composition for a non-aqueous secondary battery according to <6>, further comprising a non-electroconductive particle.

<9> An electrode for a non-aqueous secondary battery comprising a current collector, and a functional layer (A) formed on the current collector, wherein the functional layer (A) contains an electrode active material, and the binder composition for a non-aqueous secondary battery according to any one of <1> to <5>. <10> A separator for a non-aqueous secondary battery comprising a separator substrate, and a functional layer (B) formed on the separator substrate, wherein the functional layer (B) contains a non-electroconductive particle, and the binder composition for a non-aqueous secondary battery according to any one of <1> to <5>.

<11> A non-aqueous secondary battery comprising a positive electrode, a negative electrode, a separator, and an electrolytic solution, wherein one or more selected from the positive electrode and the negative electrode is the electrode for a non-aqueous secondary battery according to <9>.

<12> A non-aqueous secondary battery comprising a positive electrode, a negative electrode, a separator, and an electrolytic solution, wherein the separator is the separator for a non-aqueous secondary battery according to <10>.

<13> A method for producing an electrode for a non-aqueous secondary battery including a current collector and a functional layer (A) formed on the current collector, the method comprising forming a film of the slurry composition for a non-aqueous secondary battery according to <7> on the current collector, and drying the film to obtain the functional layer (A).

<14> A method for producing a separator for a non-aqueous secondary battery including a separator substrate and a functional layer (B) formed on the separator substrate, comprising forming a film of the slurry composition for a non-aqueous secondary battery according to <8> on the separator substrate, and drying the film to obtain the functional layer (B).

Advantageous Effects of Invention

According to the present invention, there can be provided a binder composition for a non-aqueous secondary battery capable of forming a layer having excellent adhesion ability, a slurry composition for a non-aqueous secondary battery containing the binder composition and water, and a non-aqueous secondary battery in which decrease in discharging capacity and battery swelling caused by repetition of charging-discharging are suppressed.

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the following description, the term "(meth)acrylic acid" encompasses acrylic acid, methacrylic acid, and a mixture thereof. The term "(meth)acrylate" also encompasses an acrylate, a methacrylate, and a mixture thereof. In addition, the term "(meth)acrylonitrile" encompasses acrylonitrile, methacrylonitrile, and a mixture thereof.

In the following description, that a certain substance is water-soluble means that the insoluble content thereof is less than 0.5% by weight when 0.5 g of the substance is dissolved in 100 g of water at 25° C. That a substance is water-insoluble means that the insoluble content thereof is 90% by weight or more when 0.5 g of the substance is dissolved in 100 g of water at 25° C.

In the following description, the electrode active material layer refers to a layer containing an electrode active material. The negative electrode active material layer refers to a layer containing a negative electrode active material. The positive electrode active material layer refers to a layer containing a positive electrode active material.

[1. Binder Composition for Non-Aqueous Secondary Battery]

The binder composition for a non-aqueous secondary battery of the present invention contains a water-insoluble polymer and a water-soluble polymer.

[1.1. Water-Insoluble Polymer]

The water-insoluble polymer is water-insoluble and contains 70% by weight or more and 100% by weight or less of an aliphatic conjugated diene monomer unit.

[1.1.1. Aliphatic Conjugated Diene Monomer Unit]

The aliphatic conjugated diene monomer unit is a structural unit having a structure formed by polymerizing an aliphatic conjugated diene monomer. Examples of the aliphatic conjugated diene monomers may include 1,3-butadiene, 2-methyl-1,3-butadiene, 2,3-dimethyl-1,3-butadiene, and 2-chloro-1,3-butadiene; pentadiene having conjugated double bonds in the main chain and its substituted compound; and hexadiene having conjugated double bonds in the side chain and its substituted compound. Among these, 2-methyl-1,3-butadiene and 1,3-butadiene are preferable. As the aliphatic conjugated diene monomer units in the water-insoluble polymer, one type thereof may be solely contained, and two or more types thereof may also be contained in combination at any ratio.

The ratio of the aliphatic conjugated diene monomer unit in the water-insoluble polymer is usually 70% by weight or more, preferably more than 70% by weight, more preferably 75% by weight or more, and still more preferably 80% by weight or more. Thereby the adhesion between the electrode and the separator can be improved.

The ratio of the aliphatic conjugated diene monomer unit in the water-insoluble polymer is usually 100% by weight or less, and preferably 98% by weight or less.

The ratio of the aliphatic conjugated diene monomer unit in the water-insoluble polymer usually coincides with the weight ratio of the aliphatic conjugated diene monomer relative to the total weight of the monomers used in producing the water-insoluble polymer (i.e., the charging ratio of the aliphatic conjugated diene monomer). The content ratio of each monomer unit and/or structural unit in a polymer such as a water-insoluble polymer and a water-soluble polymer may be measured using a nuclear magnetic resonance (NMR) method such as $^1$H-NMR and $^{13}$C-NMR.

[1.1.2. Other Optional Monomer Units]

The water-insoluble polymer for the present invention may contain a monomer unit other than the aliphatic conjugated diene monomer unit. The monomer units other than the aliphatic conjugated diene monomer unit are not particularly limited, and examples thereof may include an ethylenically unsaturated carboxylic acid monomer unit, an aromatic vinyl monomer, and an α,β-unsaturated nitrile monomer unit.

The water-insoluble polymer may be a copolymer in which the aliphatic conjugated diene monomer unit and another monomer unit are linearly linked, or may be a graft copolymer in which, to a block formed of the aliphatic conjugated diene monomer unit, another monomer unit is grafted.

For example, the water-insoluble polymer may be a graft copolymer in which an ethylenically unsaturated carboxylic acid monomer unit is grafted to a block formed of the aliphatic conjugated diene monomer unit.

The total ratio of the sum of the ratios of all monomer units other than the aliphatic conjugated diene monomer in the water-insoluble polymer is usually 30% by weight or less, preferably less than 30% by weight, and more preferably 28% by weight or less. Thereby the adhesion between the electrode and the separator can be improved.

[1.1.2.1. Ethylenically Unsaturated Carboxylic Acid Monomer Unit]

The ethylenically unsaturated carboxylic acid monomer unit is a structural unit having a structure formed by polymerizing an ethylenically unsaturated carboxylic acid monomer.

Examples of the ethylenically unsaturated carboxylic acid monomer may include an ethylenically unsaturated monocarboxylic acid monomer and a derivative thereof, and an ethylenically unsaturated dicarboxylic acid monomer and an anhydride thereof, and derivatives thereof. Examples of the ethylenically unsaturated monocarboxylic acid monomer may include acrylic acid, methacrylic acid, and crotonic acid. Examples of the derivatives of the ethylenically unsaturated monocarboxylic acid monomer may include 2-ethylacrylic acid, isocrotonic acid, α-acetoxyacrylic acid, β-trans-aryloxyacrylic acid, α-chloro-β-E-methoxyacrylic acid, and β-diaminoacrylic acid. Examples of the ethylenically unsaturated dicarboxylic acid monomer may include maleic acid, fumaric acid, and itaconic acid. Examples of the acid anhydride of the ethylenically unsaturated dicarboxylic acid monomer may include maleic anhydride, acrylic anhydride, methyl maleic anhydride, and dimethyl maleic anhydride. Examples of the derivative of the ethylenically unsaturated dicarboxylic acid monomer may include maleic acid substituted with a hydrocarbon group such as methylmaleic acid, dimethyl maleic acid, and phenyl maleic acid; a maleic halide such as chloromaleic acid, dichloromaleic acid, and fluoromaleic acid; a maleic acid ester such as methylallyl maleate, diphenyl maleate, nonyl maleate, decyl maleate, dodecyl maleate, octadecyl maleate, and fluoroalkyl maleate. Among these, an ethylenically unsaturated monocarboxylic acid monomer is preferable, and (meth)acrylic acid is more preferable.

As the ethylenically unsaturated carboxylic acid monomer units in the water-insoluble polymer, one type thereof may be solely contained, and two or more types thereof may also be contained in combination at any ratio.

Since the water-insoluble polymer contains the ethylenically unsaturated carboxylic acid monomer unit, the binder composition of the present invention can be used for forming a slurry composition having improved stability.

The ratio of the ethylenically unsaturated carboxylic acid monomer unit in the water-insoluble polymer is preferably 0.1% by weight or more.

The ratio of the ethylenically unsaturated carboxylic acid monomer unit in the water-insoluble polymer is preferably 30% by weight or less, more preferably less than 30% by weight, and still more preferably 25% by weight or less. Thereby the adhesion between the electrode and the separator can be improved.

The ratio of the ethylenically unsaturated carboxylic acid monomer unit in the water-insoluble polymer usually coincides with the weight ratio of the ethylenically unsaturated carboxylic acid monomer relative to the total weight of monomers used in producing the water-insoluble polymer (i.e., the charging ratio of the ethylenically unsaturated carboxylic acid monomer).

[1.1.2.2. Aromatic Vinyl Monomer Unit]

The aromatic vinyl monomer unit is a structural unit having a structure formed by polymerizing an aromatic vinyl monomer.

Examples of the aromatic vinyl monomer may include styrene, α-methylstyrene, vinyltoluene, and divinylbenzene. Among these, styrene is preferable.

As the aromatic vinyl monomer unit in the water-insoluble polymer, one type thereof may be solely contained, and two or more types thereof may also be contained in combination at any ratio.

Since the water-insoluble polymer contains the aromatic vinyl monomer unit, the binder composition of the present invention can be used for forming a slurry composition having improved stability.

The ratio of the aromatic vinyl monomer unit in the water-insoluble polymer is preferably 0.1% by weight or more.

The ratio of the aromatic vinyl monomer unit in the water-insoluble polymer is preferably 30% by weight or less, more preferably less than 30% by weight, and still more preferably 28% by weight or less. Thereby the adhesion between the electrode and the separator can be improved.

[1.1.2.3. α,β-Unsaturated Nitrile Monomer Unit]

The α,β-unsaturated nitrile monomer unit is a structural unit having a structure formed by polymerizing an α,β-unsaturated nitrile monomer. Examples of the α,β-unsaturated nitrile monomer include acrylonitrile, methacrylonitrile, α-chloracrylonitrile, and α-ethylacryonitrile. Among these, acrylonitrile and methacrylonitrile are preferable.

As the α,β-unsaturated nitrile monomer unit in the water-insoluble polymer, one type thereof may be solely contained, and two or more types thereof may also be contained in combination at any ratio.

Since the water-insoluble polymer contains the α,β-unsaturated nitrile monomer unit, the binder composition of the present invention can be used for forming a slurry composition having improved stability.

The ratio of the α,β-unsaturated nitrile monomer unit in the water-insoluble polymer is preferably 0.1% by weight or more.

The ratio of the α,β-unsaturated nitrile monomer unit in the water-insoluble polymer is preferably 30% by weight or less, more preferably less than 30% by weight, and still more preferably 28% by weight or less. Thereby the adhesion between the electrode and the separator can be improved.

[1.1.3. Containing Amount of Water-Insoluble Polymer]

The containing amount of the water-insoluble polymer in the binder composition of the present invention is preferably 10% by weight or more, more preferably 15% by weight or more, and still more preferably 20% by weight or more, and is preferably 99% by weight or less, more preferably 98% by weight or less, and still more preferably 97% by weight or less, relative to the total solid content of the binder composition.

[1.1.4. Tetrahydrofuran (THF) Insoluble Content of Water-Insoluble Polymer]

The water-insoluble polymer preferably has a THF insoluble content of 1% by weight or more.

The water-insoluble polymer has a THF insoluble content of preferably 60% by weight or less, more preferably 55% by weight or less, and still more preferably 50% by weight or less. Thereby the adhesion between the electrode and the separator can be improved.

Herein, the THF insoluble content is an amount measured by the method described in the section of Examples (THF insoluble content) to be described later.

The THF insoluble content may be adjusted, for example, by using a chain transfer agent during polymerization and adjusting the amount of the chain transfer agent. Increasing of the amount of chain transfer agent added during polymerization tends to decrease the THF insoluble content in the water-insoluble polymer, and decreasing of the amount of chain transfer agent tends to increase the THF insoluble content in the water-insoluble polymer.

[1.1.5. Glass Transition Temperature of Water-Insoluble Polymer]

The glass transition temperature of the water-insoluble polymer is preferably −75° C. or higher, more preferably −55° C. or higher, and particularly preferably −35° C. or higher, and is preferably 40° C. or lower, more preferably 30° C. or lower, still more preferably 20° C. or lower, and particularly preferably 15° C. or lower.

When the glass transition temperature of the water-insoluble polymer falls within the aforementioned range, flexibility of the electrode and adhesion between the electrode and the separator are improved. The glass transition temperature of the water-insoluble polymer may be adjusted by combining various monomers.

[1.1.6. Volume-Average Particle Diameter of Water-Insoluble Polymer]

The volume-average particle diameter of the water-insoluble polymer is preferably 0.1 μm or more, more preferably 0.12 μm or more, and still more preferably 0.15 μm or more. Thereby the adhesion between the electrode and the separator can be improved.

The volume-average particle diameter of the water-insoluble polymer is preferably 5 μm or less, more preferably 2 μm or less, and still more preferably 1.5 μm or less. Thereby the cycle characteristics of the battery can be improved.

Herein, as the volume-average particle diameter, a particle diameter when the cumulative volume calculated from the small diameter side in the particle size distribution measured by a laser diffraction method reaches 50% is adopted.

[1.1.7. Method for Producing Water-Insoluble Polymer]

The method for producing the water-insoluble polymer is not particularly limited, and may be produced by a publicly known method.

The water-insoluble polymer may be produced, for example, by polymerizing a monomer composition containing the above-mentioned monomers in an aqueous solvent. The ratios of respective monomers in the monomer composition are usually set to the same ratios as the ratios of structural units (such as the aliphatic conjugated diene monomer, ethylenically unsaturated carboxylic acid monomer, aromatic vinyl monomer, and α,β-unsaturated nitrile monomer) in the water-insoluble polymer.

The polymerization method is not particularly limited, and examples thereof may include a solution polymerization method, a suspension polymerization method, a bulk polymerization method, and an emulsion polymerization method. Among these, an emulsion polymerization method is preferable because a slurry composition can be efficiently produced.

Additives such as a surfactant, an emulsifier, a dispersant, a polymerization initiator, and a chain transfer agent may be used upon the polymerization.

Preferably, a chain transfer agent is used upon the polymerization. The THF insoluble content of the water-insoluble polymer can be adjusted by using a chain transfer agent and adjusting the amount thereof.

As the chain transfer agent, publicly known chain transfer agents may be used. Among these, alkyl mercaptan is preferable as the chain transfer agent, and t-dodecyl mercaptan is more preferable.

[1.2. Water-Soluble Polymer]

The water-soluble polymer is water-soluble and has a carboxy group and a hydroxy group. The carboxy group in the water-soluble polymer may be in a form of a salt.

The water-soluble polymer does not include water-soluble polymer compounds derived from natural products such as carboxymethylcellulose (water-soluble natural polymer).

The water-soluble polymer preferably contains a carboxy group-containing monomer unit and a hydroxy group-containing monomer unit.

Since the water-soluble polymer has a carboxy group and a hydroxy group, the binder composition of the present invention can be used for forming a slurry composition having improved stability.

[1.2.1. Carboxy Group-Containing Monomer Unit]

The carboxy group-containing monomer unit is a monomer unit containing a carboxy group. Examples of the carboxy group-containing monomer unit may include: a structural unit having a structure formed by polymerizing a carboxy group-containing monomer; and a structural unit obtained by saponifying a structural unit having a structure formed by polymerizing a monomer containing an alkoxycarbonyl group capable of generating a carboxy group by saponification. The carboxy group contained in the carboxy group-containing monomer unit may be in a form of a salt.

Examples of the carboxy group-containing monomer may include an ethylenically unsaturated carboxylic acid monomer. Examples of the ethylenically unsaturated carboxylic acid monomer may include the same examples listed in the section of the water-insoluble polymer.

Since the solubility of the obtained water-soluble polymer in water can be further enhanced, an ethylenically unsaturated carboxylic acid monomer is preferable as the carboxy group-containing monomer. An ethylenically unsaturated monocarboxylic acid is more preferable, and (meth)acrylic acid is still more preferable.

Examples of the monomer containing an alkoxycarbonyl group may include an ethylenically unsaturated carboxylic acid ester monomer, and specifically include methyl acrylate and methyl methacrylate.

As the carboxy group-containing monomer units in the water-soluble polymer, one type thereof may be solely contained, and two or more types thereof may also be contained in combination at any ratio.

The ratio of the carboxy group-containing monomer unit in the water-soluble polymer is preferably 20% by weight or more, more preferably 25% by weight or more, still more preferably 30% by weight or more, and particularly preferably more than 30% by weight, and is preferably 50% by weight or less, more preferably 45% by weight or less, and particularly preferably 40% by weight or less. When the ratio of the carboxy group-containing monomer unit is equal to or more than the lower limit value of the aforementioned range, adhesion between the electrode and the separator can be enhanced. In addition, when the ratio is equal to or less than the upper limit value of the aforementioned range, cycle characteristics of the non-aqueous secondary battery can be improved and battery life can be extended.

Herein, the ratio of the carboxy group-containing monomer unit in the water-soluble polymer usually coincides with the weight ratio of the carboxy group-containing monomer relative to the total weight of the monomers used in producing the water-soluble polymer (i.e., the charging ratio of the carboxy group-containing monomer).

[1.2.2. Hydroxy Group-Containing Monomer Unit]

The hydroxy group-containing monomer unit is a monomer unit containing a hydroxy group. Herein, the hydroxy group-containing monomer unit does not include a monomer unit containing a carboxy group.

Examples of the hydroxy group-containing monomer unit may include a structural unit having a structure formed by polymerizing a hydroxy group-containing monomer, and a structural unit having a structure formed by polymerizing a monomer having a carboxylic acid ester structure which is capable of generating a hydroxy group by saponification.

Examples of the hydroxy group-containing monomers may include a hydroxy-containing vinyl monomer, and more specifically, a hydroxyalkyl (meth)acrylate such as 2-hydroxyethyl acrylate, 2-hydroxyethyl methacrylate, 2-hydroxypropyl acrylate, 2-hydroxypropyl methacrylate, hydroxybutyl acrylate, hydroxybutyl methacrylate, 3-chloro-2-hydroxypropyl methacrylate, di-(ethylene glycol) maleate, di-(ethylene glycol) itaconate, 2-hydroxyethyl maleate, bis(2-hydroxyethyl) maleate, and 2-hydroxymethyl methyl fumarate; allyl alcohol and monoallyl ether of polyhydric alcohol; and vinylalcohol. Among these, hydroxyalkyl (meth)acrylate is preferable. Hydroxyalkyl acrylate is more preferable, and 2-hydroxyethyl acrylate is particularly preferable.

Examples of the monomer having a carboxylic acid ester structure that is capable of generating a hydroxy group by saponification may include a carboxylic acid vinyl ester (e.g., vinyl acetate).

As the hydroxy group-containing monomer units in the water-soluble polymer, one type thereof may be solely contained, and two or more types thereof may also be contained in combination at any ratio.

The ratio of the hydroxy group-containing monomer unit in the water-soluble polymer is preferably 0.5% by weight or more, more preferably 1% by weight or more, and still more preferably 1.5% by weight or more, and is preferably 80% by weight or less, more preferably 75% by weight or less, and still more preferably 70% by weight or less. When the ratio of the hydroxy group-containing monomer unit is equal to or more than the lower limit value of the aforementioned range, dispersibility of the electrode active material, the non-electroconductive particles, or the water-insoluble polymer can be increased in the slurry composition containing the binder composition of the present invention. In addition, when the ratio is equal to or less than the upper limit value, cycle characteristics of the non-aqueous secondary battery can be improved and battery life can be extended.

Herein, the ratio of the hydroxy group-containing monomer unit in the water-soluble polymer usually coincides with the weight ratio of the hydroxy group-containing monomer relative to the total weight of monomers used in producing the water-soluble polymer (i.e., the charging ratio of the hydroxy group-containing monomer).

[1.2.3. Optional Structural Unit]

The water-soluble polymer may contain an optional structural unit in addition to the carboxy group-containing monomer unit and the hydroxy group-containing monomer unit.

Examples of the optional structural units may include a fluorine-containing (meth)acrylic acid ester monomer unit, a crosslinkable monomer unit, a (meth)acrylic acid ester monomer units other than the fluorine-containing (meth)acrylic acid ester monomer unit, a (meth)acrylamide monomer unit, an ethylenically unsaturated sulfonic acid monomer unit, an ethylenically unsaturated phosphoric acid monomer unit, and a reactive surfactant monomer. Herein, among the (meth)acrylic acid ester monomer that can be contained in the water-soluble polymer, those containing fluorine are distinguished from the (meth)acrylic acid ester monomer as the fluorine-containing (meth)acrylic acid ester monomer. Also, these optional structural units do not include the carboxy group containing monomer unit and the hydroxy group containing monomer unit.

[1.2.3.1. Fluorine-Containing (Meth)Acrylic Acid Ester Monomer Unit]

The fluorine-containing (meth)acrylic acid ester monomer unit is a structural unit having a structure formed by polymerizing a fluorine-containing (meth)acrylic acid ester monomer.

Examples of the fluorine-containing (meth)acrylic acid ester monomer may include monomers represented by the following formula (I).

In the aforementioned formula (I), $R^1$ represents a hydrogen atom or a methyl group.

In the aforementioned formula (I), $R^2$ represents a hydrocarbon group containing a fluorine atom. The number of carbon atoms of the hydrocarbon group is preferably 1 or more, and preferably 18 or less. The number of fluorine atoms contained in $R^2$ may be one, and may be two or more.

Examples of the fluorine-containing (meth)acrylic acid ester monomer represented by the formula (I) may include fluorinated alkyl (meth)acrylate, fluorinated aryl (meth)acrylate, and fluorinated aralkyl (meth)acrylate. Among these, fluorinated alkyl (meth)acrylate is preferable. Examples of such monomers may include fluorinated alkyl (meth)acrylates such as 2,2,2-trifluoroethyl (meth)acrylate, β-(perfluorooctyl)ethyl (meth)acrylate, 2,2,3,3-tetrafluoropropyl (meth)acrylate, 2,2,3,4,4,4-hexafluorobutyl (meth)acrylate, 1H,1H,9H-perfluoro-1-nonyl (meth)acrylate, 1H,1H,11H-perfluoroundecyl (meth)acrylate, perfluorooctyl (meth)acrylate, trifluoromethyl (meth)acrylate, and 3[4[1-trifluoromethyl-2,2-bis[bis(trifluoromethyl)fluoromethyl] ethynyloxy]benzooxy]2-hydroxypropyl (meth)acrylate.

As the fluorine-containing (meth)acrylic acid ester monomer units in the water-soluble polymer, one type thereof may be solely contained, and two or more types thereof may also be contained in combination at any ratio.

The ratio of the fluorine-containing (meth)acrylic acid ester monomer unit in the water-soluble polymer is preferably 0.1% by weight or more, more preferably 0.2% by weight or more, and particularly preferably 0.5% by weight or more, and is preferably 50% by weight or less, more preferably 45% by weight or less, and particularly preferably 40% by weight or less. When the ratio of the fluorine-containing (meth)acrylic acid ester monomer unit is equal to or more than the lower limit value of the aforementioned range, output characteristics such as low temperature characteristics of the non-aqueous secondary battery can be improved. In addition, when the ratio is equal to or less than the upper limit value of the aforementioned range, cycle characteristics of the non-aqueous secondary battery can be improved and battery life can be extended.

Herein, the ratio of the fluorine-containing (meth)acrylic acid ester monomer unit in the water-soluble polymer usually coincides with the weight ratio of the fluorine-containing (meth)acrylic acid ester monomer relative to the total weight of monomers used in producing the water-soluble polymer (i.e., the charging ratio of the fluorine-containing (meth)acrylic acid ester monomer)

[1.2.3.2. (Meth)Acrylic Acid Ester Monomer Unit]

The (meth)acrylic acid ester monomer unit is a structural unit having a structure formed by polymerizing a (meth) acrylic acid ester monomer.

Examples of the (meth)acrylic acid ester monomer may include an alkyl ester of an acrylic acid such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and an alkyl ester of a methacrylic acid such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Among these, an alkyl ester of an acrylic acid is preferable. As the (meth)acrylic acid ester monomer in the water-soluble polymer, one type thereof may be solely contained, and two or more types thereof may also be contained in combination at any ratio.

The ratio of the (meth)acrylic acid ester monomer unit in the water-soluble polymer is preferably 25% by weight or more, more preferably 30% by weight or more, and particularly preferably 35% by weight or more, and is preferably 75% by weight or less, more preferably 70% by weight or less, and particularly preferably 65% by weight or less. When the amount of the (meth)acrylic acid ester monomer unit is equal to or more than the lower limit value of the aforementioned range, adhesion between the electrode and the separator can be increased. When the amount is equal to or less than the upper limit value of the aforementioned range, flexibility of the functional layer such as the electrode active material layer can be enhanced. Herein, the ratio of the (meth)acrylic acid ester monomer unit in the water-soluble polymer usually coincides with the weight ratio of the (meth)acrylic acid ester monomer relative to the total weight of monomers used in producing the water-soluble polymer (i.e., the charging ratio of the (meth)acrylic acid ester monomer).

[1.2.3.3. Crosslinkable Monomer Unit]

The crosslinkable monomer unit is a structural unit having a structure formed by polymerizing the crosslinkable monomer. When the water-soluble polymer contains the crosslinkable monomer unit, the water-soluble polymer can be crosslinked, so that the strength and stability of the functional layer such as the electrode active material layer can be enhanced. In addition, swelling of the functional layer to the electrolyte solution can be suppressed, and low-temperature characteristics of the non-aqueous secondary battery can be improved.

As the crosslinkable monomer, a monomer capable of forming a crosslinked structure upon polymerization may be used. Examples of the crosslinkable monomer may include monomers having two or more reactive groups per molecule. More specifically, a monofunctional monomer having a thermally crosslinkable group and one olefinic double bond per molecule, and a polyfunctional monomer having two or more olefinic double bonds per molecule may be mentioned.

Examples of the thermally crosslinkable group contained in the monofunctional monomer may include an epoxy group, an N-methylolamide group, an oxetanyl group, an oxazoline group, and combinations thereof. Among these, an epoxy group is more preferable from the viewpoint of easy adjustment of crosslinking and crosslinking density.

Examples of the crosslinkable monomer having an epoxy group as a thermally crosslinkable group and an olefinic double bond may include an unsaturated glycidyl ether such as vinyl glycidyl ether, allyl glycidyl ether, butenyl glycidyl ether, and o-allyl phenyl glycidyl ether; a monoepoxide of diene or polyene such as butadiene monoepoxide, chloroprene monoepoxide, 4,5-epoxy-2-pentene, 3,4-epoxy-1-vinylcyclohexene, and 1,2-epoxy-5,9-cyclododecadiene; an alkenyl epoxide such as 3,4-epoxy-1-butene, 1,2-epoxy-5-hexene, and 1,2-epoxy-9-decene; and glycidyl esters of unsaturated carboxylic acid such as glycidyl acrylate, glycidyl methacrylate, glycidyl crotonate, glycidyl-4-heptenoate, glycidyl sorbate, glycidyl linolate, glycidyl-4-methyl-3-pentenoate, a glycidyl ester of 3-cyclohexene carboxylic acid, and a glycidyl ester of 4-methyl-3-cyclohexene carboxylic acid.

Examples of the crosslinkable monomer having an N-methylolamide group as a thermally crosslinkable group and an olefinic double bond may include (meth)acrylamides having a methylol group such as N-methylol(meth)acrylamide.

Examples of the crosslinkable monomer having an oxetanyl group as a thermally crosslinkable group and an olefinic double bond may include 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

Examples of the crosslinkable monomer having an oxazoline group as a thermally crosslinkable group and an olefinic double bond may include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of the polyfunctional monomer having two or more olefinic double bonds may include allyl (meth)acrylate, ethylene di(meth)acrylate, diethylene glycol di(meth)acrylate, triethylene glycol di(meth)acrylate, tetraethylene glycol di(meth)acrylate, trimethylol propane-tri(meth)acrylate, dipropylene glycol diallyl ether, polyglycol diallyl ether, triethylene glycol divinyl ether, hydroquinone diallyl ether, tetraallyloxyethane, trimethylpropane-diallyl ether, allyl or vinyl ethers of polyfunctional alcohol other than those mentioned above, triallylamine, methylenebisacrylamide, and divinylbenzene.

In particular, as the crosslinkable monomer, ethylene dimethacrylate, allyl glycidyl ether, glycidyl methacrylate and divinyl benzene are preferable, and ethylene dimethacrylate and glycidyl methacrylate are more preferable.

As the crosslinkable monomer units in the water-soluble polymer, one type thereof may be solely contained, and two or more types thereof may also be contained in combination at any ratio.

The ratio of the crosslinkable monomer unit in the water-soluble polymer is preferably 0.05% by weight or more, more preferably 0.1% by weight or more, and particularly preferably 0.2% by weight or more, and is preferably 2% by weight or less, more preferably 1.5% by weight or less, and particularly preferably 1% by weight or less. When the ratio of the crosslinkable monomer unit is equal to or more than the lower limit value of the aforementioned range, cycle characteristics of the non-aqueous secondary battery can be improved and battery life can be extended. In addition, when the ratio is equal to or less than the upper limit value of the aforementioned range, adhesion between the electrode and the separator can be enhanced.

Herein, the ratio of the crosslinkable monomer unit in the water-soluble polymer usually coincides with the weight ratio of the crosslinkable monomer relative to the total weight of monomers used in producing the water-soluble polymer (i.e., the charging ratio of the crosslinkable monomer).

[1.2.3.4. Ethylenically Unsaturated Sulfonic Acid Monomer Unit]

The ethylenically unsaturated sulfonic acid monomer unit is a structural unit having a structure formed by polymerizing an ethylenically unsaturated sulfonic acid monomer.

Examples of the ethylenically unsaturated sulfonic acid monomers may include a monomer obtained by sulfonating one of the conjugated double bonds of a diene compound such as isoprene and butadiene, vinyl sulfonic acid, styrene sulfonic acid, allyl sulfonic acid, sulfoethyl methacrylate, sulfopropyl methacrylate, sulfobutyl methacrylate, 2-acrylamido-2-methylpropane sulfonic acid (AMPS), 3-allyloxy-2-hydroxypropanesulfonic acid (HAPS), and salts thereof. Examples of the salt may include a lithium salt, a sodium salt, and a potassium salt.

[1.2.3.5. Ethylenically Unsaturated Phosphoric Acid Monomer Unit]

The ethylenically unsaturated phosphoric acid monomer unit is a structural unit having a structure formed by polymerizing an ethylenically unsaturated phosphoric acid monomer.

Examples of the ethylenically unsaturated phosphoric acid monomer unit may include a monomer having an ethylenically unsaturated group and a —O—P(=O)(—$OR^a$)—$OR^b$ group (wherein $R^a$ and $R^b$ are independently a hydrogen atom or any organic group), or salts thereof. Specific examples of the organic group as $R^a$ and $R^b$ may include an aliphatic group such as an octyl group, and an aromatic group such as a phenyl group.

[1.2.3.6. Reactive Surfactant Unit]

The water-soluble polymer may contain a reactive surfactant unit. The reactive surfactant unit is a structural unit having a structure formed by polymerizing a reactive surfactant monomer. The reactive surfactant unit may form part of the water-soluble polymer and function as a surfactant.

The reactive surfactant monomer is a monomer having a polymerizable group that is capable of being copolymerized with other monomers and having a surfactant group (a hydrophilic group and a hydrophobic group). Usually, a reactive surfactant monomer has a polymerizable unsaturated group, which also acts as a hydrophobic group after polymerization. Examples of the polymerizable unsaturated group possessed by the reactive surfactant monomer may include a vinyl group, an allyl group, a vinylidene group, a propenyl group, an isopropenyl group, and an isobutylidene group. As the polymerizable unsaturated group, one type thereof may be solely used, and two or more types thereof may also be used in combination at any ratio.

The reactive surfactant monomer usually has a hydrophilic group as a hydrophilicity-expressing moiety. The reactive surfactant monomers are classified into anionic, cationic, and nonionic surfactants depending on the type of hydrophilic group.

Examples of the anionic hydrophilic group may include —$SO_3M$, —COOM, and —$PO(OM)_2$. Herein, M represents a hydrogen atom or a cation. Examples of the cation may include ions of alkali metal such as lithium, sodium, and potassium; ions of alkaline earth metal such as calcium and magnesium; an ammonium ion; an ammonium ion of an alkylamine such as monomethylamine, dimethylamine, monoethylamine, and triethylamine; and an ammonium ion of an alkanolamine such as monoethanolamine, diethanolamine, and triethanolamine.

Examples of the cationic hydrophilic group may include a primary amine salt such as —$NH_3^+X^-$, a secondary amine salt such as —$N(CH_3)H_2^+X^-$, a tertiary amine salt such as —$N(CH_3)2H^+X^-$, and a quaternary ammonium, such as —$N^+(CH_3)_3X^-$. Herein, X represents a halogen atom.

Examples of the nonionic hydrophilic group may include —OH.

As the reactive surfactant monomers, one type thereof may be solely used, and two or more types thereof may also be used in combination at any ratio.

[1.2.4. Containing Amount of Water-Soluble Polymer]

The containing amount of the water-soluble polymer in the binder composition of the present invention is preferably 1% by weight or more, more preferably 2% by weight or more, and still more preferably 3% by weight or more, and is preferably 90% by weight or less, more preferably 85% by weight or less, and still more preferably 80% by weight or less, relative to the total solid content of the binder composition.

[1.2.5. Properties of Water-Soluble Polymer]

The viscosity of the 1 wt % aqueous solution of the water-soluble polymer is preferably 10 mPa·s or more, more preferably 20 mPa·s or more, and particularly preferably 50 mPa·s or more, and is preferably 10000 mPa·s or less, more preferably 8000 mPa·s or less, and particularly preferably 7000 mPa·s or less. When the viscosity is equal to or more than the lower limit value of the aforementioned range, the binder composition may be made in a good slurry form. When the viscosity is equal to or less than the upper limit value, coating property of the slurry composition containing the binder composition of the present invention can be improved, and adhesion strength between the electrode and the separator can be improved. The viscosity may be adjusted, for example, by the molecular weight of the water-soluble polymer. Herein, the viscosity is a value measured by using a viscometer (type B) at 25° C. and a rotational speed of 60 rpm.

[1.2.6. Method for Producing Water-Soluble Polymer]

The method for producing the water-soluble polymer is not particularly limited, and may be produced by a publicly known method.

The water-soluble polymer may be produced, for example, by polymerizing a monomer composition containing the above-mentioned monomers in an aqueous solvent. In this case, the ratios of respective monomers in the monomer composition are usually the same as the ratios of structural units (e.g., the carboxy group-containing monomer unit, hydroxy group-containing monomer unit, fluorine-containing (meth)acrylic acid monomer unit, and crosslinkable monomer unit) in the water-soluble polymer.

The water-soluble polymer may be produced by polymerizing a monomer composition containing a monomer containing an alkoxycarbonyl group capable of generating a carboxy group by saponification and a monomer having a carboxylic acid ester structure capable of generating a hydroxy group by saponification, and then saponifying the resulting polymer.

The polymerization method is not particularly limited, and examples thereof may include a solution polymerization method, a suspension polymerization method, a bulk polymerization method, and an emulsion polymerization method. An emulsion polymerization method is preferable because a slurry composition can be efficiently produced.

Additives such as a surfactant, an emulsifier, a dispersant, a polymerization initiator, and a chain transfer agent may be added upon polymerization.

[1.3. Component Ratio in Binder Composition]

The weight ratio (water-soluble polymer/water-insoluble polymer) of the water-soluble polymer relative to the water-insoluble polymer in the binder composition is preferably 1/35 or more, and more preferably 1/30 or more, and is preferably 1/0.2 or less, and more preferably 0/0.3 or less.

[1.4. Optional Components]

The binder composition may contain an optional component in addition to the water-insoluble polymer and the water-soluble polymer described above. The optional components are not particularly limited, and examples thereof may include a thickener, an antioxidant, an antifoaming agent, and a dispersant.

Examples of the thickener may include a cellulosic polymer such as carboxymethylcellulose, methylcellulose, and hydroxypropylcellulose, and salts thereof; (modified) poly (meth)acrylic acid and salts thereof; polyvinyl alcohols such as (modified) polyvinyl alcohol; polyethylene glycol, polyethylene oxide, polyvinyl pyrrolidone, modified polyacrylic acid, oxidized starch, phosphate starch, casein, various modified starches, acrylonitrile-butadiene copolymer hydrides, and the like. Among these, cellulosic polymer and salts thereof, (modified) poly(meth)acrylic acid and salts thereof are preferable, and cellulosic polymer and salts thereof are more preferable. Examples of the salt may include an ammonium salt and an alkali metal salt. One type thereof may be solely used, and two or more types thereof may also be used in combination at any ratio. Herein, "(modified)poly-" means "unmodified poly-" or "modified poly-"

Since the binder composition contains the thickener, dispersibility of the particles such as the electrode active material or the non-electroconductive particles is improved in the slurry composition containing the binder composition.

Examples of the antioxidant may include a phenol compound, a hydroquinone compound, an organophosphorus compound, a sulfur compound, a phenylenediamine compound, and a polymer-type phenol compound.

The binder composition preferably contains an antioxidant. This may improve the stability of the binder composition.

Examples of the defoaming agent may include metal soaps, polysiloxanes, polyethers, higher alcohols, and perfluoroalkyls.

The binder composition preferably contains a defoaming agent. By containing the defoaming agent, an electrode or a separator can be efficiently produced using the binder composition.

[1.5. Use Application of Binder Composition for Non-Aqueous Secondary Battery]

The binder composition of the present invention may be suitably used, for example, for producing an electrode or a separator of a non-aqueous secondary battery. For example, the binder composition may be processed to be in a form of a slurry composition further containing an electrode active material and water, and the slurry composition may be applied onto a current collector to produce an electrode. Alternatively, the binder composition may be processed to be in a form of a slurry composition further containing non-electroconductive particles and water, and the slurry composition may be applied onto a separator substrate to produce a separator.

[2. Slurry Composition for Non-Aqueous Secondary Battery]

The slurry composition for a non-aqueous secondary battery of the present invention contains the binder composition for a non-aqueous secondary battery of the present invention described above and water. The binder composition for a non-aqueous secondary battery described above can be uniformly dispersed in a dispersion medium containing water. That is, in the slurry composition for a non-aqueous secondary battery of the present invention, the binder composition contained therein is uniformly dispersed, and therefore a film of the slurry composition can be uniformly formed on a current collector or a separator substrate. As a result, adhesion between the electrode and the separator can be improved.

The slurry composition may contain a dispersion medium other than water. For example, when a liquid capable of dissolving a water-insoluble polymer and a water-soluble polymer is combined with water, the water-insoluble polymer and the water-soluble polymer are adsorbed on the surface of particles that may be contained in the slurry composition such as the electrode active material and the non-electroconductive particles, so that dispersion of the particles is stabilized, which is preferable.

Herein, the dispersion medium may be a medium in which the components of the slurry composition are dissolved.

The type of dispersion medium to be combined with water is preferably selected from the viewpoints of drying speed and environmental aspects. Preferable examples may include cyclic aliphatic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone and ε-caprolactone; nitriles such as acetonitrile and propionitrile; ethers such as tetrahydrofuran and ethylene glycol diethyl ether; alcohols such as methanol, ethanol, isopropanol, ethyleneglycol, and ethyleneglycol monomethyl ether; and amides such as N-methylpyrrolidone, and N,N-dimethylformamide. Among these, N-methylpyrrolidone (NMP) is preferable.

As the dispersion medium other than water, the slurry composition may solely contain one type thereof, and may also contain two or more types thereof in combination at any ratio.

The amount of the dispersion medium containing water in the slurry composition is preferably adjusted so that the viscosity of the slurry composition of the present invention becomes a viscosity suitable for application. Specifically, the concentration of the solid content of the slurry composition of the present invention is preferably adjusted to a value that is 30% by weight or more, and more preferably 35% by weight or more, and is preferably 70% by weight or less, and more preferably 65% by weight or less. Herein, the solid content of the slurry composition refers to a substance that remains as a component of the functional layer formed on the electrode or the separator after drying of the slurry composition.

[2.1. Electrode Active Material]

The slurry composition preferably contains an electrode active material.

An electrode for a non-aqueous secondary battery can be produced by forming on a current collector a film of a slurry composition containing an electrode active material.

Among the electrode active materials, an electrode active material for a positive electrode (hereinafter, sometimes referred to as a "positive electrode active material" as appropriate) is not particularly limited, and, for example, a material capable of intercalating and deintercalting lithium ions is used. Such a positive electrode active material is roughly classified into a material made of an inorganic compound and a material made of an organic compound.

Examples of the positive electrode active material made of an inorganic compound may include a transition metal oxide, a transition metal sulfide, and a lithium-containing composite metal oxide of lithium and a transition metal. Examples of the transition metal may include Ti, V, Cr, Mn, Fe, Co, Ni, Cu, and Mo.

Examples of the transition-metal oxide may include MnO, $MnO_2$, $V_2O_5$, $V_6O_{13}$, $TiO_2$, $Cu_2V_2O_3$, amorphous $V_2O$—$P_2O_5$, $MoO_3$, $V_2O_5$, and $V_6O_{13}$. Among these, MnO, $V_2O_5$, $V_6O_{13}$, and $TiO_2$ are preferable from the viewpoint of cycle stability and capacity.

Examples of the transition-metal sulfide may include $TiS_2$, $TiS_3$, amorphous $MoS_2$, and FeS.

Examples of the lithium-containing composite metal oxide may include a lithium-containing composite metal oxide having a layered structure, a lithium-containing composite metal oxide having a spinel structure, and a lithium-containing composite metal oxide having an olivine-type structure.

Examples of the lithium-containing composite metal oxide having a layered structure may include a lithium-containing cobalt oxide ($LiCoO_2$), a lithium-containing nickel oxide ($LiNiO_2$), a lithium composite oxide of Co—Ni—Mn, a lithium composite oxide of Ni—Mn—Al, and a lithium composite oxide of Ni—Co—Al.

Examples of the lithium-containing composite metal oxide having a spinel structure may include lithium manganate ($LiMn_2O_4$) and $Li[Mn_{3/2}M_{1/2}]O_4$ in which a part of Mn of lithium manganate is substituted with another transition metal (where M is Cr, Fe, Co, Ni, Cu, or the like).

Examples of the lithium-containing composite metal oxide having an olivine-type structure may include an olivine-type lithium phosphate compound represented by $Li_xMPO_4$ (wherein M represents at least one element selected from the group consisting of Mn, Fe, Co, Ni, Cu, Mg, Zn, V, Ca, Sr, Ba, Ti, Al, Si, B, and Mo, and X represents a number satisfying $0 \leq X \leq 2$).

Examples of the positive electrode active material made of an organic compound may include an electroconductive polymer compound such as polyacetylene and poly-p-phenylene.

Alternatively, a positive electrode active material composed of a composite material in which an inorganic compound and an organic compound are combined may be used.

Further, for example, an iron-based oxide may be subjected to reduction firing in the presence of a carbon source material to produce a composite material covered with a carbon material, and the composite material may be used as a positive electrode active material. Although the iron-based oxide tends to have poor electrical conductivity, when it is formed as the composite material as described above, it can be used as a high-performance positive electrode active material.

Further, a material obtained by partial elemental substitution of the aforementioned compound may be used as the positive electrode active material.

Alternatively, a mixture of the inorganic compound and the organic compound described above may be used as the positive electrode active material.

As the positive electrode active material, one type thereof may be solely used, and two or more types thereof may also be used in combination at any ratio.

The volume-average particle diameter of the particles of the positive electrode active material is preferably 1 µm or more, and more preferably 2 µm or more, and is preferably 50 µm or less, and more preferably 30 µm or less. When the average particle diameter of the particles of the positive electrode active material falls within the aforementioned range, the amount of the binder when preparing the positive electrode active material layer can be reduced, and thereby decrease in the capacity of the non-aqueous secondary battery can be suppressed. In addition, the viscosity of the slurry composition of the present invention can be easily adjusted to an appropriate viscosity which facilitates application, and a uniform positive electrode can be obtained. Herein, as the volume-average particle diameter, a particle diameter when the cumulative volume calculated from the small diameter side in the particle size distribution measured by a laser diffraction method reaches 50% is adopted.

The amount of the positive electrode active material is preferably 90% by weight or more, and more preferably 95% by weight or more, and is preferably 99.9% by weight or less, and more preferably 99% by weight or less, in terms of the ratio of the positive electrode active material in the electrode active material layer. When the amount of the positive electrode active material falls within the aforementioned range, capacity of the non-aqueous secondary battery can be increased, and flexibility of the positive electrode and the adhesion between the current collector and the positive electrode active material layer can be improved.

Among the electrode active materials, an electrode active material for a negative electrode (hereinafter sometimes referred to as "negative electrode active material" as appropriate) is a material for transferring electrons in a negative electrode. As the negative electrode active material, for example, a material capable of absorbing and releasing lithium ions may be used.

Examples of suitable negative electrode active materials may include carbon. Examples of the carbon may include natural graphite, artificial graphite, and carbon black. Among these, natural graphite is preferably used.

As the negative electrode active material, a negative electrode active material containing at least one selected from the group consisting of tin, silicon, germanium, and lead may be used.

Examples of the silicon-based active material may include SiO, $SiO_2$, $SiO_x$ ($0.01 \leq x \leq 2$), SiC, and SiOC.

As the negative electrode active material, one type thereof may be solely used, and two or more types thereof may also be used in combination at any ratio. Thus, among the negative electrode active materials described above, two of them may be combined for use.

The negative electrode active material may preferably a material that is granulated to be in a particulate form. If the shape of the particles is spherical, a denser electrode can be formed when the electrode is molded.

The volume-average particle diameter of the particles of the negative electrode active material is appropriately selected in consideration of other constitutional requirements of the non-aqueous secondary battery, and is preferably 0.1 µm or more, more preferably 1 µm or more, and particularly preferably 5 µm or more, and is preferably 100 µm or less, more preferably 50 µm or less, and particularly preferably 20 µm or less.

The amount of the negative electrode active material is preferably 85% by weight or more, and more preferably 88% by weight or more, and is preferably 99% by weight or less, and more preferably 97% by weight or less, in terms of the ratio of the negative electrode active material in the electrode active material layer. When the amount of the negative electrode active material falls within the aforementioned range, a negative electrode exhibiting flexibility and adhesion while exhibiting high capacity can be realized.

[2.2. Non-Electroconductive Particle]

The slurry composition preferably contains non-electroconductive particles.

By forming a film of a slurry composition containing non-electroconductive particles on the separator substrate, a separator for a non-aqueous secondary battery can be produced.

The non-electroconductive particles may form a porous membrane on the separator substrate as the gaps between the particles form pores. Since the non-electroconductive particles have non-conductivity, the porous membrane can be made insulating, so that a short circuit in the secondary battery can be prevented. Usually, the non-electroconductive particles have high rigidity, which can increase the mechanical strength of the porous membrane. Therefore, even when a stress for contracting is generated by heat in the substrate such as the separator substrate, the porous membrane can withstand the stress, and therefore the occurrence of a short circuit due to the contraction of the substrate can be prevented.

As the non-electroconductive particles, inorganic particles may be used, and organic particles may also be used.

The inorganic particles are usually excellent in dispersion stability in water, have low tendency to cause precipitation in the slurry composition, and can maintain a uniform slurry state for a long period of time. When inorganic particles are used, heat resistance of the porous membrane can usually be increased.

As the material of the non-electroconductive particles, an electrochemically stable material is preferable. From this viewpoint, preferable examples of inorganic materials for the non-electroconductive particles may include oxide particles such as aluminum oxide (alumina), hydrate of aluminum oxide (boehmite (AlOOH)), gibbsite ($Al(OH)_3$), bakelite, iron oxide, silicon oxide, magnesium oxide (magnesia), magnesium hydroxide, calcium oxide, titanium oxide (titania), $BaTiO_3$, ZrO, and alumina-silica composite oxide; nitride particles such as aluminum nitride, silicon nitride, and boron nitride; covalently bonded crystal particles such as silicon, and diamond; insoluble ion crystal particles such as barium sulfate, calcium fluoride, and barium fluoride; and clay particles such as silica, talcum, and montmorillonite.

Among these, alumina, boehmite, and barium sulfate are preferable from the viewpoint of low water absorption and excellent heat resistance (e.g., resistance to high temperature of 180° C. or higher).

As the organic particles, polymer particles are usually used. By adjusting the type and amount of functional groups on the surface of the organic particles, the affinity of the organic particles to water can be controlled, and thus the amount of water contained in the porous membrane can be controlled. Usually, the organic particles are excellent in that the elution of metal ions is small.

Examples of the polymer forming the non-electroconductive particles may include various polymer compounds such as polystyrene, polyethylene, polyimide, a melamine resin, a phenol resin, and an acrylic resin. The polymer compounds forming the particles may be either a homopolymer or a copolymer, and in the case of copolymer, any of a block copolymer, a random copolymer, a graft copolymer, and an alternating copolymer may be used. Further, at least a part thereof may be modified or crosslinked. A mixture of these may also be used. Examples of the crosslinking agent in the case of a crosslinked product may include a crosslink entity having an aromatic ring such as divinylbenzene, a polyfunctional acrylate crosslink entity such as ethylene glycol dimethacrylate, and a crosslink entity having an epoxy group such as glycidyl acrylate and glycidyl methacrylate.

The non-electroconductive particles may be subjected to, for example, element substitution, surface treatment, solid solution treatment, or the like, if necessary. One particle of the non-electroconductive particles may contain solely one type of the materials described above, and may also contain two or more types thereof in combination at any ratio. Furthermore, as the non-electroconductive particles, two or more types of particles formed of different materials may also be used in combination.

Examples of the shape of the non-electroconductive particles may include a spherical shape, an elliptical shape, a polygonal shape, a tetrapod (registered trademark) shape, a plate shape, and a scaly shape.

The ratio of the non-electroconductive particles in the layer containing the binder composition and the non-electroconductive particles formed on the separator substrate is preferably 50% by weight or more, more preferably 55% by weight or more, and still more preferably 60% by weight or more, and is preferably 99% by weight or less, more preferably 98% by weight or less, and still more preferably 95% by weight or less.

The ratio (non-electroconductive particles/water-soluble polymer) of the non-electroconductive particles relative to the water-soluble polymer is preferably 20/10 or more, more preferably 20/9 or more, and still more preferably 20/8 or more, and is preferably 20/0.01 or less, more preferably 20/0.05 or less, and still more preferably 20/0.1 or less, in terms of weight ratio.

[2.3. Method for Producing Slurry Composition for Non-Aqueous Secondary Battery]

The slurry composition may be produced by, for example, mixing the binder composition containing a water-insoluble polymer and a water-soluble polymer of the present invention, an electrode active material or a non-electroconductive particle, water, and an optional component. The specific procedure for this production method may be freely selected. Examples of the method for producing the slurry composition which contains the binder composition of the present invention, an electrode active material, an electroconductive material, and water may include: a method of simultaneously mixing a water-insoluble polymer, a water-soluble polymer, an electrode active material, and an electroconductive material into water; a method of dissolving a water-soluble polymer into water, mixing a water-insoluble polymer that has been dispersed in water, and thereafter mixing an electrode active material and an electroconductive material; and a method of mixing an electrode active material and an electroconductive material into a water-insoluble polymer that has been dispersed in water, and mixing to this mixture a water-soluble polymer that has been dissolved in water.

Examples of the mixing unit may include mixing devices such as a ball mill, a sand mill, a bead mill, a roll mill, a pigment disperser, a grinding mixer, an ultrasonic disperser, a homogenizer, a homomixer, and a planetary mixer.

[3. Electrode for Non-Aqueous Secondary Battery]

The electrode for a non-aqueous secondary battery of the present invention includes a current collector and a functional layer (A) formed on the current collector. The functional layer (A) contains an electrode active material and the binder composition for a non-aqueous secondary battery of the present invention. The electrode for a non-aqueous secondary battery of the present invention may be produced by a method including forming, on a current collector, a film of the slurry composition for a non-aqueous secondary battery containing an electrode active material, and drying the formed film to obtain a functional layer (A).

[3.1. Current Collector]

The current collector is not particularly limited as long as it has electrical conductivity and is an electrochemically durable material. However, the current collector is preferably a metal material, as it has heat resistance. Examples of a material for the current collector may include iron, copper, aluminum, nickel, stainless steel, titanium, tantalum, gold, and platinum. Among these, aluminum is preferable for the current collector used for a positive electrode, and copper is preferable as the current collector used for a negative electrode. As the material, one type thereof may be solely used, or two or more types thereof may also be used in combination at any ratio.

The shape of the current collector is not particularly limited, and is preferably a sheet having a thickness of about 0.001 mm to 0.5 mm.

In order to enhance adhesion strength with the functional layer (A) serving as an electrode active material layer, the surface of the current collector is preferably subjected to a roughing treatment prior to use. Examples of the roughing method may include a mechanical polishing method, an electrolytic polishing method, and a chemical polishing method. In the mechanical polishing method, for example, abrasive cloth or paper with abrasive particles adhering thereto, a grindstone, an emery wheel, a wire brush provided with steel wires, etc. is used. In order to enhance the adhesion strength and electroconductivity of the functional layer (A), an interlayer may be formed on the surface of the current collector.

[3.2. Formation of Film of Slurry Composition]

After the current collector has been prepared, a film of the slurry composition of the present invention is formed on the current collector. In this process, the film of the slurry composition is usually formed by applying the slurry composition of the present invention. The slurry composition may be applied onto either one surface or both surfaces of the current collector.

The applying method is not particularly limited. Examples thereof may include a doctor blade method, a dipping method, a reverse roll method, a direct roll method, a gravure method, an extrusion method, and a brushing method.

The thickness of the film of the slurry composition may be appropriately set in accordance with the thickness of an intended functional layer (A).

Since the slurry composition of the present invention has excellent applying properties, a uniform film can be formed by the aforementioned application. Also, since the slurry composition of the present invention has excellent dispersibility and dispersion stability, the obtained film usually has an excellent uniformity in chemical composition. Furthermore, since the water-soluble polymer is contained, the slurry composition of the present invention has high viscosity. Therefore, occurrence of convection is inhibited in the film of the slurry composition of the present invention, and thus migration is suppressed.

[3.3. Drying of Film]

After the film of the slurry composition has been formed, liquid such as water is removed from the film by drying. Consequently, a functional layer (A) containing an electrode active material and the binder composition is formed on the surface of the current collector to obtain an electrode.

Examples of the drying method may include: drying by air such as warm air, hot air, and low-moisture air; vacuum drying; and a drying method by irradiation with energy rays such as infrared rays, far infrared rays, and electron beam. Among these, irradiation with far infrared rays is preferable.

The drying temperature and drying time are preferably those that allow for removal of water from the film of the slurry composition. Exemplifying specific ranges, the drying time is preferably 1 minute to 30 minutes, and the drying temperature is preferably 40° C. to 180° C.

[3.4. Optional Process]

The method for producing the electrode for a non-aqueous secondary battery of the present invention may include an optional process in addition to the aforementioned processes. For example, when the functional layer (A) includes a polymer which is curable by a curing reaction such as a cross-linking reaction, the polymer may be cured after the functional layer (A) is formed.

[4. Separator for Non-Aqueous Secondary Battery]

The separator for a non-aqueous secondary battery of the present invention includes a separator substrate and a functional layer (B) formed on the separator substrate. The functional layer (B) contains a non-electroconductive particle and the binder composition for a non-aqueous secondary battery of the present invention.

The separator for a non-aqueous secondary battery of the present invention may be produced by, for example, a production method including forming, on a separator substrate, a film of the slurry composition for non-aqueous secondary battery including a non-electroconductive particle, and drying the formed film to obtain a functional layer (B).

[4.1. Separator Substrate]

The separator substrate to be used may be any of substrates used in non-aqueous secondary batteries. Example of the separator substrate may include a porous member formed of an organic material. A specific example thereof may include a porous member containing a polyolefin resin such as polyethylene and polypropylene.

The thickness of the separator substrate may be freely set, and is not particularly limited. However, the thickness is usually 0.5 µm or more, and preferably 5 µm or more, and is usually 40 µm or less, preferably 35 µm or less, and more preferably 30 µm or less.

[4.2. Formation of Film of Slurry Composition]

After the separator substrate has been prepared, a film of the slurry composition of the present invention is formed on the separator substrate. In this process, the film of the slurry composition is usually formed by applying the slurry composition of the present invention. The slurry composition may be applied onto either one surface or both surfaces of the separator substrate. The applying method is not limited. Examples thereof may include the same methods as those mentioned in the description of the method for producing an electrode.

The thickness of the film of the slurry composition may be appropriately set in accordance with the thickness of an intended functional layer (B).

[4.3. Drying of Film]

After the film of the slurry composition has been formed, liquid such as water is removed from the film by drying. Consequently, a functional layer (B) containing a non-electroconductive particle and the binder composition is formed on the surface of the separator substrate to obtain a separator.

Examples of the drying method may include the same methods as those mentioned in the description of the method for producing an electrode.

The preferable drying temperature and drying time are the same as those mentioned in the description of the method for producing an electrode.

[4.4. Optional Process]

The separator of the present invention may be produced by a method including an optional process in addition to the aforementioned processes. For example, when the functional layer (B) contains a polymer that is curable by a curing reaction such as a cross-linking reaction, the polymer may be cured after the functional layer (B) is formed.

[5. Non-Aqueous Secondary Battery]

The non-aqueous secondary battery of the present invention includes a positive electrode, a negative electrode, a separator, and an electrolytic solution. At least one selected from the aforementioned positive electrode and the aforementioned negative electrode is the electrode for a non-aqueous secondary battery of the present invention. Alternatively, the aforementioned separator is the separator for a non-aqueous secondary battery of the present invention.

When the non-aqueous secondary battery includes the electrode for a non-aqueous secondary battery of the present invention or the separator for a non-aqueous secondary battery of the present invention, adhesion between the separator and the electrode can be enhanced. Therefore, an additional adhesive layer does not need to be disposed on the electrode for a non-aqueous secondary battery of the present invention or on the separator for a non-aqueous secondary battery of the present invention.

[5.1. Electrolytic Solution]

The electrolytic solution to be used may be, for example, an electrolytic solution obtained by dissolving lithium salt as a support electrolyte in a non-aqueous solvent. Examples of the lithium salt may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among these, $LiPF_6$, $LiClO_4$, and $CF_3SO_3Li$, which easily dissolve in a solvent and exhibit high dissociation degree, are suitably used. One type thereof may be solely used, and two or more types thereof may also be used in combination.

The amount of the support electrolyte is preferably 1% by weight or more, and more preferably 5% by weight or more, and is preferably 30% by weight or less, and more preferably 20% by weight or less, relative to the electrolytic solution. Either in the case wherein the amount of the support electrolyte is excessively small and in the case wherein the amount is excessively large, ion conductivity decreases, which may lead to a decrease in charging properties and discharging properties of the secondary battery.

The solvent used for the electrolytic solution is not particularly limited as long as the solvent can dissolve therein the support electrolyte. Examples of the solvent for use may include: alkyl carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Among these, dimethyl carbonate, ethylene carbonate, propylene carbonate, diethyl carbonate, and methyl ethyl carbonate are preferable, because high ion conductivity is easily obtained, and the use temperature range is wide. As the solvent, one type thereof may be solely used, and two or more types thereof may also be used in combination.

The electrolytic solution may contain an additive if necessary. Preferable examples of the additive may include carbonate-based compounds such as vinylene carbonate (VC). As the additive, one type thereof may be solely used, and two or more types thereof may also be used in combination.

Other examples of the electrolytic solution may include: a gel form polymer electrolyte obtained by impregnating a polymer electrolyte such as polyethylene oxide and polyacrylonitrile with an electrolytic solution; and an inorganic solid electrolyte such as lithium sulfide, LiI, and $Li_3N$.

[5.2. Method for Producing Non-Aqueous Secondary Battery]

The method for producing the non-aqueous secondary battery of the present invention is not particularly limited. For example, a positive electrode and a negative electrode may be stacked via a separator. The obtained product may be wound, folded, or the like to be in conformity with the shape of a battery, and placed in a battery container. Then, an electrolytic solution may be injected into the battery container, and the container may be sealed. Furthermore, an expanded metal, an overcurrent prevention element such as a fuse and a PTC element, and a lead plate may be placed in the container if necessary for preventing the pressure increase inside the battery and the overcharging and overdischarging. The shape of the battery may be any of, for example, a laminate cell type, a coin type, a button type, a sheet type, a cylinder type, a rectangular type, and a flat type.

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. Also, the following operations were performed at normal temperature and under normal pressure, unless otherwise specified.

[Evaluation Items]

(Viscosity)

The viscosity of a 1 wt % aqueous solution of the water-soluble polymer was measured under the following conditions.

Measuring device: B-type viscometer
Measurement temperature: 25° C.
Rotation speed: 60 rpm (THF Insoluble Content)

An aqueous dispersion liquid of the polymer thus obtained was dried under the environment of a relative humidity of 50% and a temperature of 23° C. to 25° C. to produce a film having a thickness of 1±0.3 mm. The produced film was cut into 5 mm squares to prepare a plurality of film pieces. About 1 g of these film pieces was precisely weighed. The weight of the precisely weighed film pieces was defined as W0. Subsequently, the precisely weighed film pieces were immersed in 100 g of tetrahydrofuran (THF) at 25° C. for 24 hours. Thereafter, the film pieces were taken out of THF. The taken film pieces were dried under vacuum at 105° C. for 3 hours. The weight (weight of insoluble contents) W1 of the dried film pieces was measured. Then, a THF insoluble content (%) was calculated in accordance with the following formula. The value of THF insoluble content was rounded to nearest integers.

THF insoluble content (%)=$W1/W0 \times 100$ (Volume-Average Particle Diameter)

The volume-average particle diameter was determined as follows. That is, a particle size distribution was measured using a "LS13320" measuring device manufactured by Beckman Coulter, Inc. A diameter when the cumulative volume calculated from a small diameter side reaches 50% was adopted as the volume-average particle diameter.

(Evaluation of Press Adhesion Strength)

The positive electrode, negative electrode, and separator prepared in each of Examples and Comparative Examples were each cut out into a width of 10 mm and a length of 50 mm. The cut-out positive electrode and separator were stacked, and the stacked body was pressed by a flat plate press device at a temperature of 70° C. and a load of 5 MPa to obtain a test piece. Separately, the cut-out negative electrode and separator were stacked, and the stacked body was pressed by a flat plate press device at a temperature of 70° C. and a load of 5 MPa to obtain a test piece.

A cellophane tape was attached to the electrode surface of each of these test pieces. As the cellophane tape, the one defined in JIS Z1522 was used. The test piece was placed on a horizontal test board with the current collector-side surface of the electrode (the positive electrode or the negative electrode) facing downward, so that the cellophane tape was fixed to the test board.

Then, one end of the separator was pulled vertically upward at a speed of 50 mm/min. The stress when it was peeled was measured.

This measurement was performed three times for each of the stacked body of the positive electrode and the separator and the stacked body of the negative electrode and the separator. Thus, the measurement was performed six times in total. An average value of the stress was calculated as a peel strength. Based on this, the adhesion ability between the electrode substrate (current collector) and the separator substrate was evaluated in accordance with the following criteria.

Higher peel strength is indicative of higher adhesion ability.

Evaluation criteria when the slurry composition is applied onto the separator substrate:
A: Peel strength is 10 N/m or more.
B: Peel strength is 7 N/m or more and less than 10 N/m.
C: Peel strength is 4 N/m or more and less than 7 N/m.
D: Peel strength is less than 4 N/m.

Evaluation criteria when the slurry composition is applied onto the current collector:
A: Peel strength is 5 N/m or more.
B: Peel strength is 3 N/m or more and less than 5 N/m.
C: Peel strength is 2 N/m or more and less than 3 N/m.
D: Peel strength is less than 2 N/m.

(Battery Swelling)

The lithium ion secondary battery including a negative electrode, a positive electrode, and a separator produced in each of Examples and Comparative Examples was left to stand under the environment of 25° C. for 24 hours. Thereafter, the initial capacity of the produced lithium ion secondary battery was checked. Then, the lithium ion secondary battery was fully charged at 25° C. by a 4.35 V constant voltage constant current (CC-CV) charging mode (cut-off condition: 0.02 C). The thickness of the cell after full charging was measured at ten locations using a thickness measuring machine. An average value of the measured values was calculated as an average thickness T0. Then, 300 cycles of charging-discharging was performed at 45° C. by a constant voltage constant current (CC-CV) charging mode at 4.35 V and 1 C and a constant current (CC) discharging mode at 3.0 V and 1 C. Thereafter, an average thickness T2 of the cell at full charging was measured in the same manner as that for the aforementioned T0. Then, the thickness change rate (%) (=(T2−T0)/T0×100) was calculated. The thickness change rate (%) was evaluated in accordance with the following criteria. Smaller thickness change rate is indicative of more suppressed swelling degree of the cell (after 300 cycles).

A: Less than 5% after 300 cycles
B: 5% or more and less than 10% after 300 cycles
C: 10% or more and less than 15% after 300 cycles
D: 15% or more after 300 cycles (Cycle Properties)

The lithium ion secondary battery produced in each of Examples and Comparative Examples was left to stand under the environment of 25° C. for 24 hours. Thereafter, a charging-discharging operation was performed in which the lithium ion secondary battery was charged to 4.35 V at 25° C. with a charging rate of 1 C by a constant voltage constant current (CC-CV) mode (cut-off condition: 0.02 C), and discharged to 3.0 V with a discharging rate of 1 C by a constant current (CC) mode, to measure an initial capacity C0.

The same charging-discharging operation was repeated under the environment of 45° C., to measure a capacity C1 after 300 cycles. Then, a capacity maintenance ratio $\Delta C = (C1/C0) \times 100(\%)$ was calculated, and evaluated in accordance with the following criteria. Higher value of this capacity maintenance ratio is indicative of smaller decrease of discharging capacity, and better cycle properties.

A: Capacity maintenance ratio $\Delta C$ is 80% or more.
B: Capacity maintenance ratio $\Delta C$ is 75% or more and less than 80%.
C: Capacity maintenance ratio $\Delta C$ is 70% or more and less than 75%.
D: Capacity maintenance ratio $\Delta C$ is less than 70%.

[Production Example 1-1] (Production of Water-Insoluble Polymer A1)

Isoprene rubber (manufactured by ZEON Corporation, product name "Nipol IR2200") was dissolved in toluene to prepare a 25% isoprene rubber solution. Then, sodium linear alkylbenzene sulfonate was dissolved in ion-exchanged water to prepare an aqueous solution having a solid content concentration of 5%. Into a tank, 500 g of the isoprene rubber solution and 500 g of the aqueous solution were charged. The mixture was stirred for pre-mixing. Subsequently, the obtained pre-mixed solution was transferred from the tank to a Milder (product name "MDN303V" manufactured by Pacific Machinery & Engineering Co., Ltd.) through a metering pump at a speed of 100 g/min, and stirred at a revolution of 20000 rpm for emulsification (phase-transfer emulsification). Subsequently, toluene in the emulsified liquid thus obtained was distilled away under reduced pressure by a rotary evaporator. Thereafter, the residue was left to stand for 1 day in a chromatography column with a cock so that it was separated into two layers. The lower layer after separation was removed, to thereby perform concentration. Then, the upper layer was filtered through a 100 mesh wire screen to prepare latex containing polyisoprene (IR) particles. The solid content concentration of the latex of polyisoprene thus obtained was 60%, and the volume-average particle diameter of the contained polyisoprene particles was 0.9 μm.

Into a container X, 5 parts of methacrylic acid as an ethylenically unsaturated carboxylic acid monomer, and 2.5 parts (ion-exchanged water had been added thereto to constitute a 20% aqueous solution for use) of sodium lauryl sulfate as an emulsifier were added. The mixture was stirred for emulsification.

Thereafter, into the container X, the produced latex (solid content concentration: 60%) containing particulate polyisoprene having a volume-average particle diameter of 0.9 μm was added in an amount of 95 parts in terms of solid contents. The product was left to stand for 2 hours, and thereafter stirred. After sufficient stirring, 0.6 part of tetraethylenepentamine and 0.6 part of t-butyl hydroxide as polymerization initiators were further added for initiating graft polymerization. The reaction temperature was maintained at 30° C. After 1.5 hours of the graft polymerization, the temperature was increased to 70° C., which was maintained for 3 hours. Then, it was confirmed that the polymerization conversion ratio reached 97% or more, and the reaction was terminated. Thus, there was obtained an aqueous dispersion liquid (solid content concentration: 40%) containing a particulate polymer (a water-insoluble polymer A1) in which a graft portion containing an ethylenically unsaturated carboxylic acid monomer unit had been introduced to the particles.

[Production Example 1-2] (Production of Water-Insoluble Polymer A2)

Into a reaction vessel, there were charged, in this order, 180 parts of ion-exchanged water, 25 parts of a sodium dodecylbenzenesulfonate aqueous solution (concentration: 10%) as an emulsifier, 8 parts of acrylonitrile as an α,β-unsaturated nitrile monomer, 5 parts of styrene as an aromatic vinyl monomer, 5 parts of methacrylic acid as an ethylenically unsaturated carboxylic acid monomer, and 0.25 part of t-dodecyl mercaptan as a molecular weight adjuster. Subsequently, the gas inside the reaction vessel was substituted with nitrogen three times. Thereafter, 82 parts of 1,3-butadiene as an aliphatic conjugated diene monomer was charged. Into the reaction vessel maintained at 10° C., 0.1 part of cumene hydroperoxide as a polymerization initiator was charged for initiating a polymerization reaction. The polymerization reaction continued for 16 hours while stirring. Then, 0.1 part of a hydroquinone aqueous solution (concentration: 10%) as a polymerization terminator was added for terminating the polymerization reaction. Thereafter, the residue monomers were removed using a rotary evaporator at a water temperature of 60° C. to obtain an aqueous dispersion liquid of a particulate polymer (a water-insoluble polymer A2).

[Production Example 1-3] (Production of Water-Insoluble Polymer A3)

A mixture containing 60 parts of 1,3-butadiene as an aliphatic conjugated diene monomer, 35 parts of styrene as an aromatic vinyl monomer, 5 parts of acrylic acid as an ethylenically unsaturated carboxylic acid monomer, and 0.3 part of sodium lauryl sulfate as an emulsifier was charged in a container Y. Addition of the mixture from the container Y into a pressure resistant container Z was started. At the same time, addition of 1 part of potassium persulfate as a polymerization initiator into the pressure resistant container Z started. Thus, polymerization was initiated. The reaction temperature was maintained at 75° C. After 5.5 hours of the polymerization, the reaction mixture was warmed to 85° C., and the reaction was further continued for 6 hours. When the polymerization conversion ratio reached 97%, the mixture was cooled to terminate the reaction. Thus, a mixture containing a particulate polymer was obtained. To this mixture containing the particulate polymer, a 5% sodium hydroxide aqueous solution was added to adjust the pH to 8. Thereafter, unreacted monomers were removed through distillation by heating under reduced pressure. Then, the residue was cooled to obtain an aqueous dispersion liquid (solid content concentration: 40%) containing a particulate polymer (a water-insoluble polymer A3) having a volume-average particle diameter of 0.15 μm.

[Production Example 2-1] (Production of Water-Soluble Polymer W1)

Into a 5 MPa pressure resistant container equipped with a stirrer, there were charged 4 parts of 2-hydroxyethyl acrylate (a hydroxy group-containing monomer), 32.5 parts of methacrylic acid (a carboxy group-containing monomer), 0.8 part of ethylene dimethacrylate (a crosslinkable monomer), 7.5 parts of 2,2,2-trifluoroethyl methacrylate (a fluorine-containing (meth)acrylic acid ester monomer), 55.2 parts of ethyl acrylate (a (meth)acrylic acid ester monomer), 0.1 part of sodium dodecylbenzenesulfonate (a surfactant), 0.1 part of t-dodecyl mercaptan (a molecular weight adjuster), 150 parts of ion-exchanged water, and 0.5 part of potassium persulfate (a polymerization initiator). The mixture was sufficiently stirred. Thereafter, the reaction mixture was warmed to 60° C., to thereby initiate polymerization. When the polymerization conversion ratio reached 96%, the mixture was cooled to terminate the reaction. Thus, a mixture containing a water-soluble polymer was obtained. To the mixture containing the water-soluble polymer, 10% ammonia water was added to adjust the pH to 8. Thus, an aqueous solution containing a desired water-soluble polymer W1 was obtained. A portion of this aqueous solution was taken, and the concentration was adjusted to 1%. The viscosity of the aqueous solution after adjustment was measured.

[Production Example 2-2] (Production of water-soluble polymer W2)

Into a 1 L flask equipped with a septum, 720 g of ion-exchanged water was charged, and heated to 40° C. The atmosphere inside the flask was substituted with nitrogen gas at a flow rate of 100 mL/min. Subsequently, there were mixed 10 g of ion-exchanged water, 25 parts of acrylic acid as an ethylenically unsaturated carboxylic acid monomer, 35 parts of acrylamide as a (meth)acrylamide monomer, and 40 parts of 2-hydroxyethyl acrylate as a hydroxy group-containing vinyl monomer. The mixture was charged into a flask using a syringe. Thereafter, 8 parts of a 2.5% aqueous solution of potassium persulfate as a polymerization initiator was added into the flask using a syringe. After 15 minutes, 22 parts of a 2.0% aqueous solution of tetramethylethylenediamine as a polymerization accelerator was further added using a syringe. After 4 hours, 4 parts of a 2.5% aqueous solution of potassium persulfate as a polymerization initiator was added into the flask. Furthermore, 11 parts of a 2.0% aqueous solution of tetramethylethylenediamine as a polymerization accelerator was added. The temperature was increased to 60° C. so that a polymerization reaction was promoted. After 3 hours, the flask was opened to the air to terminate the polymerization reaction. The product was deodorized at a temperature of 80° C. to remove residue monomers. Thereafter, a 10% aqueous solution of lithium hydroxide was used to adjust the pH of the product to 8. Thus, there was obtained an aqueous solution including a water-soluble polymer W2 which contains an ethylenically unsaturated carboxylic acid monomer unit, a (meth)acrylamide monomer unit, and a hydroxy group-containing vinyl monomer unit at a specific ratio. A portion of this aqueous solution was taken, and the concentration was adjusted to 1%. The viscosity of the aqueous solution after adjustment was measured.

[Production Example 2-3] (Production of Water-Soluble Polymer W3)

Into a 2 L-volume reaction tank equipped with a stirrer, a thermometer, an $N_2$ gas introduction pipe, a reflux condenser, and a dropping funnel, there were charged 768 g of water and 12 g of anhydrous sodium sulfate. $N_2$ gas was blown into the reaction tank to deoxidize the system. Subsequently, 1 g of partially saponified polyvinyl alcohol (saponification degree: 88%) and 1 g of lauryl peroxide were charged. The inside temperature was increased to 60° C. Thereafter, monomers of 104 g (1.209 mol) of methyl acrylate and 155 g (1.802 mol) of vinyl acetate were dropped through a dropping funnel over 4 hours, and the inside temperature of 65° C. was maintained for 2 hours. Thus, the reaction was completed. Thereafter, solid contents were filtered off to obtain 288 g (contained water: 10.4%) of a vinyl acetate/methyl acrylate copolymer. Into another reaction tank of the same type, there were charged 450 g of methanol, 420 g of water, 132 g (3.3 mol) of sodium hydroxide, and 288 g (contained water: 10.4%) of the obtained water-containing copolymer. A saponification reaction was performed under stirring at 30° C. for 3 hours. After the termination of the saponification reaction, the saponified copolymer thus obtained was washed with methanol, filtered, and dried at 70° C. for 6 hours. Thus, there was obtained 193 g of a saponified vinyl acetate/methyl acrylate copolymer (copolymer of vinyl alcohol and sodium acrylate). This polymer was dissolved in water again to obtain a water-soluble polymer W3. A portion of this aqueous solution was taken, and the concentration was adjusted to 1%. The viscosity of the aqueous solution after adjustment was measured.

Example 1

(Preparation of Slurry Composition for Negative Electrode)

Into a planetary mixer equipped with a disper, there were added 100 parts of artificial graphite (manufactured by Hitachi Chemical Co., Ltd., product name "MAG-E") as a negative electrode active material, 1 part of carbon black (manufactured by TIMCAL Ltd., product name "Super C65") as an electroconductive material, and 3 parts (in terms of solid contents) of a product obtained by mixing the water-insoluble polymer A1 and the water-soluble polymer W3 at a solid content ratio of 2:1. Thus, a mixture was obtained. The mixture thus obtained was adjusted to a solid content concentration of 50% with ion-exchanged water, and thereafter mixed at 25° C. for 60 minutes. Subsequently, the solid content concentration was adjusted to 48% with ion-exchanged water. Thereafter, the mixture was further mixed at 25° C. for 15 minutes to obtain a mixed liquid. The mixed liquid was further mixed for 10 minutes, and thereafter defoamed under reduced pressure. Consequently, there was obtained a slurry composition for a negative electrode of a non-aqueous secondary battery which has favorable fluidity.

(Production of negative electrode)

The Slurry Composition for a Negative Electrode of a non-aqueous secondary battery thus obtained was applied onto a copper foil having a thickness of 20 μm as a current collector using a comma coater such that the negative electrode active material layer after drying had a weight per unit area of 11 mg/cm$^2$ and a density of 1.00 g/cm$^3$. Then, the coat was dried. This drying was performed by delivering the copper foil at a speed of 0.5 m/min in an oven at 60° C. over 2 minutes. Thereafter, a heating treatment was performed at 120° C. for 2 minutes to obtain a pre-press negative electrode primary product. This pre-press negative electrode primary product was rolled by a roll press device to obtain a post-press negative electrode in which the density of the negative electrode active material layer was 1.65 g/cm$^3$.

(Production of Positive Electrode)

There were mixed 100 parts of LiCoO$_2$ having a volume-average particle diameter of 12 μm as a positive electrode active material, 2 parts of acetylene black (manufactured by Denki Kagaku Kogyo Kabushiki Kaisha, product name "HS-100") as an electroconductive material, 2 parts in terms of solid contents of polyvinylidene fluoride (manufactured by Kureha Corporation, product name "#7208") as a binder, and N-methylpyrrolidone as a solvent, such that the total solid content concentration became 70%. This mixture was mixed by a planetary mixer to obtain a slurry composition for a positive electrode of a non-aqueous secondary battery.

The slurry composition for a positive electrode of a non-aqueous secondary battery thus obtained was applied onto an aluminum foil having a thickness of 20 μm as a current collector using a comma coater such that the film thickness after drying became about 150 μm. Then, the coat was dried. This drying was performed by delivering the aluminum foil at a speed of 0.5 m/min in an oven at 60° C. over 2 minutes. Thereafter, a heating treatment was performed at 120° C. for 2 minutes to obtain a positive electrode primary product.

Then, the positive electrode primary product thus obtained was rolled by a roll press machine to obtain a positive electrode including a positive electrode active material layer.

(Preparation of Separator)

A separator (formed of polyethylene, thickness: 12 μm) substrate was prepared.

(Production of Lithium Ion Secondary Battery)

The post-press positive electrode obtained as described above was cut out into a 4 cm×4 cm square, and the post-press negative electrode was cut out into a 4.2 cm×4.2 cm square. Further, a 5 cm×5 cm separator was cut out from the separator substrate. Subsequently, the cut-out separator was disposed on the positive electrode active material layer of the cut-out post-press positive electrode. Furthermore, the cut-out post-press negative electrode was placed on the disposed separator at its surface not being in contact with the positive electrode such that the negative electrode active material layer of the negative electrode faces the separator. Thus, a stacked body of battery members was obtained. Subsequently, the stacked body of battery members thus obtained was pressed at a temperature of 70° C. and a pressure of 5 MPa to favorably constitute bonding between layers of separator/negative electrode among (positive electrode/separator/negative electrode).

Subsequently, the stacked body of battery members thus obtained was wrapped with an aluminum package sheath as a sheath body of a battery. Into the sheath, an electrolytic solution (solvent: ethylene carbonate (EC)/diethyl carbonate (DEC)/vinylene carbonate (VC) (volume ratio=68.5/30/1.5), electrolyte: LiPF$_6$ having a concentration of 1 mol/L) was injected in such a manner as to completely eliminate air. Then, the opening of the aluminum package sheath was heat sealed at a temperature of 150° C. such that the aluminum package sheath was sealed and closed. Thus, a 40 mAh stacked-type lithium ion secondary battery was produced.

Example 2

A lithium ion secondary battery was produced by the same manner as that of Example 1, except that the water-soluble polymer W2 was used instead of the water-soluble polymer W3 in the preparation of the slurry composition for a negative electrode.

Example 3

A lithium ion secondary battery was produced by the same manner as that of Example 1, except that the water-soluble polymer W1 was used instead of the water-soluble polymer W3 in the preparation of the slurry composition for a negative electrode.

Example 4

A lithium ion secondary battery was produced by the same manner as that of Example 1, except that the water-insoluble polymer A2 was used instead of the water-insoluble polymer A1 in the preparation of the slurry composition for a negative electrode.

Example 5

A lithium ion secondary battery was produced by the same manner as that of Example 1, except that the water-insoluble polymer A2 was used instead of the water-insoluble polymer A1 and the water-soluble polymer W2 was used instead of the water-soluble polymer W3 in the preparation of the slurry composition for a negative electrode.

Example 6

A lithium ion secondary battery was produced by the same manner as that of Example 1, except that the water-insoluble polymer A2 was used instead of the water-insoluble polymer A1 and the water-soluble polymer W1 was used instead of the water-soluble polymer W3 in the preparation of the slurry composition for a negative electrode.

Example 7

(Preparation of Slurry Composition for Negative Electrode)

Into a planetary mixer equipped with a disper, there were mixed 100 parts of artificial graphite (manufactured by Hitachi Chemical Co., Ltd., product name "MAG-E") as a negative electrode active material, 1 part of carbon black (manufactured by TIMCAL Ltd., product name "Super C65") as an electroconductive material, and 1 part in terms of solid contents of carboxymethyl cellulose ("MAC350HC" manufactured by Nippon Paper Industries Co., Ltd.) as a thickener. The mixture thus obtained was adjusted to a solid content concentration of 58% with ion-exchanged water, and thereafter mixed at 25° C. for 60 minutes. Subsequently, the solid content concentration was adjusted to 50% with ion-exchanged water.

To the mixed liquid, 1 part in terms of solid contents of an aqueous dispersion liquid containing the water-insoluble polymer A1 was added. Then, ion-exchanged water was added to adjust the final solid content concentration to 48%. The mixed liquid was further mixed for 10 minutes, and defoamed under reduced pressure to obtain a slurry composition for a negative electrode of a lithium ion secondary battery.

(Production of Negative Electrode)

The slurry composition for a negative electrode of a non-aqueous secondary battery thus obtained was applied onto a copper foil having a thickness of 20 μm as a current collector using a comma coater such that the negative electrode active material layer after drying had a weight per unit area of 11 mg/cm$^2$ and a density of 1.00 g/cm$^3$. Then, the coat was dried. This drying was performed by delivering the copper foil at a speed of 0.5 m/min in an oven at 60° C. over 2 minutes. Thereafter, a heating treatment was performed at 120° C. for 2 minutes to obtain a pre-press negative electrode primary product. This pre-press negative electrode primary product was rolled by a roll press device to obtain a post-press negative electrode in which the density of the negative electrode active material layer was 1.65 g/cm$^3$.

(Production of Positive Electrode)

There were mixed 100 parts of LiCoO$_2$ having a volume-average particle diameter of 12 μm as a positive electrode active material, 2 parts of acetylene black (manufactured by Denki Kagaku Kogyo Kabushiki Kaisha, product name "HS-100") as an electroconductive material, 2 parts in terms of solid contents of polyvinylidene fluoride (manufactured by Kureha Corporation, product name "#7208") as a binder, and N-methylpyrrolidone as a solvent, such that the total solid content concentration became 70%. This mixture was mixed by a planetary mixer to obtain a slurry composition for a positive electrode of a non-aqueous secondary battery.

The slurry composition for a positive electrode of a non-aqueous secondary battery thus obtained was applied onto an aluminum foil having a thickness of 20 μm as a current collector using a comma coater such that the film thickness after drying became about 150 μm. Then, the coat was dried. This drying was performed by delivering the aluminum foil at a speed of 0.5 m/min in an oven at 60° C. over 2 minutes. Thereafter, a heating treatment was performed at 120° C. for 2 minutes to obtain a positive electrode primary product.

Then, the positive electrode primary product thus obtained was rolled by a roll press machine to obtain a positive electrode including a positive electrode active material layer.

(Preparation of Separator Substrate)

A separator (formed of polyethylene, thickness: 12 μm) substrate was prepared.

(Preparation of Slurry Composition for Functional Layer (B))

There were mixed, using a ball mill, 100 parts by weight in terms of solid contents of alumina (manufactured by Sumitomo Chemical Company, Limited, product name "AKP3000") as a non-electroconductive particle, 10 parts by weight of the water-insoluble polymer A1, 1 part by weight of the water-soluble polymer W3, 0.8 part by weight of polyacrylic acid as a dispersant, and ion-exchanged water in such an amount that the solid content concentration became 40%. Thus, a slurry composition for a functional layer was prepared.

(Production of Separator Including Functional Layer (B))

The slurry composition for the functional layer (B) obtained as described above was applied onto a separator substrate such that the slurry composition for the functional layer (B) had a coating thickness of 2 μm. Then, the coat was dried at 50° C. for 10 minutes. This operation was performed to both surfaces of the separator substrate. Consequently, an adhesive layer as the functional layer (B) was formed on both surfaces of the separator substrate. Thus, there was obtained a separator including the functional layers (B) on both surfaces.

(Production of Lithium Ion Secondary Battery)

The post-press positive electrode thus obtained was cut out into a 4 cm×4 cm square, and the post-press negative electrode was cut out into a 4.2 cm×4.2 cm square. Further, the separator including the functional layers (B) on both surfaces thus obtained was cut out into a 5 cm×5 cm square. Subsequently, the cut-out separator including the functional layers (B) on both surfaces was disposed on the positive electrode active material layer of the cut-out post-press positive electrode. Furthermore, the cut-out post-press negative electrode was placed on the disposed separator at its surface not being in contact with the positive electrode such that the negative electrode active material layer of the negative electrode faces the separator. Thus, a stacked body of battery members was obtained. Subsequently, the stacked body of battery members thus obtained was pressed at a temperature of 70° C. and a pressure of 5 MPa to favorably constitute bonding between layers of separator/negative electrode among (positive electrode/separator/negative electrode).

Subsequently, the stacked body of battery members thus obtained was wrapped with an aluminum package sheath as a sheath body of a battery. Into the sheath, an electrolytic solution (solvent: ethylene carbonate (EC)/diethyl carbonate (DEC)/vinylene carbonate (VC) (volume ratio=68.5/30/1.5), electrolyte: $LiPF_6$ having a concentration of 1 mol/L) was injected in such a manner as to totally eliminate air. Then, the opening of the aluminum package sheath was heat sealed at a temperature of 150° C. such that the aluminum package sheath was sealed and closed. Thus, a 40 mAh stacked-type lithium ion secondary battery was produced.

Example 8

A lithium ion secondary battery was produced by the same manner as that of Example 7, except that the water-soluble polymer W2 was used instead of the water-soluble polymer W3 in the preparation of the slurry composition for a functional layer (B).

Example 9

A lithium ion secondary battery was produced by the same manner as that of Example 7, except that the water-soluble polymer W1 was used instead of the water-soluble polymer W3 in the preparation of the slurry composition for a functional layer (B).

Example 10

A lithium ion secondary battery was produced by the same manner as that of Example 7, except that the water-insoluble polymer A2 was used instead of the water-insoluble polymer A1 in the preparation of the slurry composition for a functional layer (B).

Example 11

A lithium ion secondary battery was produced by the same manner as that of Example 7, except that the water-insoluble polymer A2 was used instead of the water-insoluble polymer A1 and the water-soluble polymer W2 was used instead of the water-soluble polymer W3 in the preparation of the slurry composition for a functional layer (B).

Example 12

A lithium ion secondary battery was produced by the same manner as that of Example 7, except that the water-insoluble polymer A2 was used instead of the water-insoluble polymer A1 and the water-soluble polymer W1 was used instead of the water-soluble polymer W3 in the preparation of the slurry composition for a functional layer (B).

Comparative Example 1

A lithium ion secondary battery was produced by the same manner as that of Example 1, except that the water-insoluble polymer A3 was used instead of the water-insoluble polymer A1 and the water-soluble polymer W1 was used instead of the water-soluble polymer W3 in the preparation of the slurry composition for a negative electrode.

Comparative Example 2

A lithium ion secondary battery was produced by the same manner as that of Example 7, except that the water-insoluble polymer A3 was used instead of the water-insoluble polymer A1 and the water-soluble polymer W1 was used instead of the water-soluble polymer W3 in the preparation of the slurry composition for a functional layer (B).

The results of Examples and Comparative Examples described above are shown in the following Tables.

TABLE 1

| | | | Ex. 1 | Ex. 2 | Ex. 3 |
|---|---|---|---|---|---|
| Water-insoluble polymer | Type | | A1 | A1 | A1 |
| | Aliphatic conjugated diene monomer unit | Isoprene (wt %) | 95 | 95 | 95 |
| | | 1,3-butadiene (wt %) | 0 | 0 | 0 |
| | Ethylenically unsaturated carboxylic acid unit | Methacrylic acid (wt %) | 5 | 5 | 5 |
| | | Acrylic acid (wt %) | 0 | 0 | 0 |
| | Aromatic vinyl monomer unit | styrene (wt %) | 0 | 0 | 0 |
| | α,β-unsaturated nitrile monomer unit | Acrylonitrile (wt %) | 0 | 0 | 0 |
| | THF insoluble content (%) | | 3 | 3 | 3 |
| | Volume-average particle diameter (μm) | | 0.9 | 0.9 | 0.9 |
| Water-soluble polymer | Type | | W3 | W2 | W1 |
| | 1 wt % aqueous solution viscosity | | 1400 mP·s | 300 mPa·s | 800 mPa·s |

TABLE 1-continued

|  |  |  | Ex. 1 | Ex. 2 | Ex. 3 |
|---|---|---|---|---|---|
| Mixing ratio | Water-insoluble polymer | (in terms of solid contents) | 2 | 2 | 2 |
|  | Water-soluble polymer | (in terms of solid contents) | 1 | 1 | 1 |
| Other components contained in slurry composition | Electrode active material |  | Negative electrode active material | Negative electrode active material | Negative electrode active material |
|  | Non-electroconductive particles |  |  |  |  |
| Adhesion ability | Subject of slurry composition application: separator substrate |  | — | — | — |
|  | Subject of slurry composition application: current collector |  | A | A | A |
| Battery swelling |  |  | B | A | B |
| Cycle characteristics |  |  | A | A | A |

TABLE 2

|  |  |  | Ex. 4 | Ex. 5 | Ex. 6 |
|---|---|---|---|---|---|
| Water-insoluble polymer | Type |  | A2 | A2 | A2 |
|  | Aliphatic conjugated diene monomer unit | Isoprene (wt %) | 0 | 0 | 0 |
|  |  | 1,3-butadiene (wt %) | 82 | 82 | 82 |
|  | Ethylenically unsaturated carboxylic acid unit | Methacrylic acid (wt %) | 5 | 5 | 5 |
|  |  | Acrylic acid (wt %) | 0 | 0 | 0 |
|  | Aromatic vinyl monomer unit | styrene (wt %) | 5 | 5 | 5 |
|  | α,β-unsaturated nitrile monomer unit | Acrylonitrile (wt %) | 8 | 8 | 8 |
|  | THF insoluble content (%) |  | 5 | 5 | 5 |
|  | Volume-average particle diameter (μm) |  | 0.2 | 0.2 | 0.2 |
| Water-soluble polymer | Type |  | W3 | W2 | W1 |
|  | 1 wt % aqueous solution viscosity |  | 1400 mP·s | 300 mPa·s | 800 mPa·s |
| Mixing ratio | Water-insoluble polymer | (in terms of solid contents) | 2 | 2 | 2 |
|  | Water-soluble polymer | (in terms of solid contents) | 1 | 1 | 1 |
| Other components contained in slurry composition | Electrode active material |  | Negative electrode active material | Negative electrode active material | Negative electrode active material |
|  | Non-electroconductive particles |  |  |  |  |
| Adhesion ability | Subject of slurry composition application: separator substrate |  | — | — | — |
|  | Subject of slurry composition application: current collector |  | B | B | B |
| Battery swelling |  |  | B | A | B |
| Cycle characteristics |  |  | A | A | B |

TABLE 3

|  |  |  | Ex. 7 | Ex. 8 | Ex. 9 |
|---|---|---|---|---|---|
| Water-insoluble polymer | Type |  | A1 | A1 | A1 |
|  | Aliphatic conjugated diene monomer unit | Isoprene (wt %) | 95 | 95 | 95 |
|  |  | 1,3-butadiene (wt %) | 0 | 0 | 0 |

TABLE 3-continued

|  |  |  | Ex. 7 | Ex. 8 | Ex. 9 |
|---|---|---|---|---|---|
|  | Ethylenically unsaturated carboxylic acid unit | Methacrylic acid (wt %) | 5 | 5 | 5 |
|  |  | Acrylic acid (wt %) | 0 | 0 | 0 |
|  | Aromatic vinyl monomer unit | styrene (wt %) | 0 | 0 | 0 |
|  | α,β-unsaturated nitrile monomer unit | Acrylonitrile (wt %) | 0 | 0 | 0 |
|  | THF insoluble content (%) |  | 3 | 3 | 3 |
|  | Volume-average particle diameter (μm) |  | 0.9 | 0.9 | 0.9 |
| Water-soluble polymer | Type |  | W3 | W2 | W1 |
|  | 1 wt % aqueous solution viscosity |  | 1400 mP · s | 300 mPa · s | 800 mPa · s |
| Mixing ratio | Water-insoluble polymer | (in terms of solid contents) | 10 | 10 | 10 |
|  | Water-soluble polymer | (in terms of solid contents) | 1 | 1 | 1 |
| Other components contained in slurry composition | Electrode active material |  |  |  |  |
|  | Non-electroconductive particles |  | Al₂O₃ | Al₂O₃ | Al₂O₃ |
| Adhesion ability | Subject of slurry composition application: separator substrate |  | A | A | A |
|  | Subject of slurry composition application: current collector |  | — | — | — |
| Battery swelling |  |  | B | A | B |
| Cycle characteristics |  |  | A | A | B |

TABLE 4

|  |  |  | Ex. 10 | Ex. 11 | Ex. 12 |
|---|---|---|---|---|---|
| Water-insoluble polymer | Type |  | A2 | A2 | A2 |
|  | Aliphatic conjugated diene monomer unit | Isoprene (wt %) | 0 | 0 | 0 |
|  |  | 1,3-butadiene (wt %) | 82 | 82 | 82 |
|  | Ethylenically unsaturated carboxylic acid unit | Methacrylic acid (wt %) | 5 | 5 | 5 |
|  |  | Acrylic acid (wt %) | 0 | 0 | 0 |
|  | Aromatic vinyl monomer unit | styrene (wt %) | 5 | 5 | 5 |
|  | α,β-unsaturated nitrile monomer unit | Acrylonitrile (wt %) | 8 | 8 | 8 |
|  | THF insoluble content (%) |  | 5 | 5 | 5 |
|  | Volume-average particle diameter (μm) |  | 0.2 | 0.2 | 0.2 |
| Water-soluble polymer | Type |  | W3 | W2 | W1 |
|  | 1 wt % aqueous solution viscosity |  | 1400 mPa · s | 300 mPa · s | 800 m Pa· s |
| Mixing ratio | Water-insoluble polymer | (in terms of solid contents) | 10 | 10 | 10 |
|  | Water-soluble polymer | (in terms of solid contents) | 1 | 1 | 1 |
| Other components contained in slurry composition | Electrode active material |  |  |  |  |
|  | Non-electroconductive particles |  | Al₂O₃ | Al₂O₃ | Al₂O₃ |
| Adhesion ability | Subject of slurry composition application: separator substrate |  | B | B | B |
|  | Subject of slurry composition application: current collector |  | — | — | — |

TABLE 4-continued

|  | Ex. 10 | Ex. 11 | Ex. 12 |
| --- | --- | --- | --- |
| Battery swelling | B | B | B |
| Cycle characteristics | B | B | B |

TABLE 5

| | | | Comp. Ex. 1 | Comp. Ex. 2 |
| --- | --- | --- | --- | --- |
| Water-insoluble polymer | Type | | A3 | A3 |
| | Aliphatic conjugated diene monomer unit | Isoprene (wt %) | 0 | 0 |
| | | 1,3-butadiene (wt %) | 60 | 60 |
| | Ethylenically unsaturated carboxylic acid unit | Methacrylic acid (wt %) | 0 | 0 |
| | | Acrylic acid (wt %) | 5 | 5 |
| | Aromatic vinyl monomer unit | styrene (wt %) | 35 | 35 |
| | α,β-unsaturated nitrile monomer unit | Acrylonitrile (wt %) | 0 | 0 |
| | THF insoluble content (%) | | 90 | 90 |
| | Volume-average particle diameter (μm) | | 0.15 | 0.15 |
| Water-soluble polymer | Type | | W1 | W1 |
| | 1 wt % aqueous solution viscosity | | 800 mPa · s | 800 mPa · s |
| Mixing ratio | Water-insoluble polymer | (in terms of solid contents) | 2 | 10 |
| | Water-soluble polymer | (in terms of solid contents) | 1 | 1 |
| Other components contained in slurry composition | Electrode active material | | Negative electrode active material | |
| | Non-electroconductive particles | | | Al$_2$O$_3$ |
| Adhesion ability | Subject of slurry composition application: separator substrate | | | D |
| | Subject of slurry composition application: current collector | | D | |
| Battery swelling | | | C | C |
| Cycle characteristics | | | C | C |

As understood from the aforementioned results, the slurry compositions of Examples can favorably bond the separator substrate and the electrode. It is also understood that, for the lithium secondary batteries of Examples, the battery swelling after repetition of charging-discharging is suppressed, and cycle properties are made favorable.

The invention claimed is:

1. A binder composition for a non-aqueous secondary battery comprising: a water-insoluble polymer and a water-soluble polymer, wherein
the water-insoluble polymer contains 70% by weight or more and 98% by weight or less of an aliphatic conjugated diene monomer unit,
the aliphatic conjugated diene monomer unit is 2-methyl-1,3-butadiene monomer unit or 1,3-butadiene monomer unit,
the water-soluble polymer has a carboxy group and a hydroxy group,
the water-soluble polymer contains 20% by weight or more and 50% by weight or less of a carboxy group-containing monomer unit and 0.5% by weight or more and 80% by weight or less of a hydroxy group-containing monomer unit,
the carboxy group-containing monomer unit is an ethylenically unsaturated carboxylic acid monomer unit,
the hydroxy group-containing monomer unit is hydroxyalkyl (meth)acrylate unit, and
a volume-average particle diameter of the water-insoluble polymer is 0.2 μm or more and 0.9 μm or less.

2. The binder composition for a non-aqueous secondary battery according to claim 1, wherein the water-insoluble polymer has a tetrahydrofuran insoluble content of 1% by weight or more and 60% by weight or less.

3. The binder composition for a non-aqueous secondary battery according to claim 1, wherein a viscosity of a 1 wt % aqueous solution of the water-soluble polymer is 10 mPa·s or more and 10000 mPa·s or less.

4. A slurry composition for a non-aqueous secondary battery comprising the binder composition for a non-aqueous secondary battery according to claim 1, and water.

5. The slurry composition for a non-aqueous secondary battery according to claim 4, further comprising an electrode active material.

6. The slurry composition for a non-aqueous secondary battery according to claim 4, further comprising a non-electroconductive particle.

7. An electrode for a non-aqueous secondary battery comprising a current collector, and a functional layer (A) formed on the current collector, wherein the functional layer (A) contains an electrode active material, and the binder composition for a non-aqueous secondary battery according to claim 1.

8. A separator for a non-aqueous secondary battery comprising a separator substrate, and a functional layer (B) formed on the separator substrate, wherein
the functional layer (B) contains a non-electroconductive particle, and the binder composition for a non-aqueous secondary battery according to claim 1.

9. A non-aqueous secondary battery comprising a positive electrode, a negative electrode, a separator, and an electrolytic solution, wherein
one or more selected from the positive electrode and the negative electrode is the electrode for a non-aqueous secondary battery according to claim 7.

10. A non-aqueous secondary battery comprising a positive electrode, a negative electrode, a separator, and an electrolytic solution, wherein
the separator is the separator for a non-aqueous secondary battery according to claim 8.

11. A method for producing an electrode for a non-aqueous secondary battery including a current collector and a functional layer (A) formed on the current collector, the method comprising
forming a film of the slurry composition for a non-aqueous secondary battery according to claim 5 on the current collector, and drying the film to obtain the functional layer (A).

12. A method for producing a separator for a non-aqueous secondary battery including a separator substrate and a functional layer (B) formed on the separator substrate, comprising
forming a film of the slurry composition for a non-aqueous secondary battery according to claim 6 on the separator substrate, and drying the film to obtain the functional layer (B).

* * * * *